United States Patent
Gao et al.

(10) Patent No.: US 11,082,958 B2
(45) Date of Patent: Aug. 3, 2021

(54) PUCCH-BASED UPLINK CONTROL INFORMATION TRANSMISSION METHOD AND APPARATUS

(71) Applicant: CHINA ACADEMY OF TELECOMMUNICATIONS TECHNOLOGY, Beijing (CN)

(72) Inventors: Xuejuan Gao, Beijing (CN); Fang-Chen Cheng, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 15/763,088

(22) PCT Filed: Aug. 12, 2016

(86) PCT No.: PCT/CN2016/094975
§ 371 (c)(1),
(2) Date: Mar. 23, 2018

(87) PCT Pub. No.: WO2017/050062
PCT Pub. Date: Mar. 30, 2017

(65) Prior Publication Data
US 2018/0279295 A1 Sep. 27, 2018

(30) Foreign Application Priority Data
Sep. 25, 2015 (CN) .......................... 201510624635.3

(51) Int. Cl.
*H04W 72/04* (2009.01)
*H04L 5/00* (2006.01)

(52) U.S. Cl.
CPC ....... *H04W 72/0413* (2013.01); *H04L 5/0053* (2013.01); *H04W 72/042* (2013.01);
(Continued)

(58) Field of Classification Search
CPC ........... H04W 72/0413; H04W 72/042; H04W 72/0446; H04L 5/0053; H04L 5/001; H04L 5/0048; H04L 5/005; H04L 5/0055
See application file for complete search history.

(56) References Cited

U.S. PATENT DOCUMENTS

2011/0243066 A1* 10/2011 Nayeb Nazar .......... H04L 1/007
370/328
2012/0082145 A1* 4/2012 Chen ..................... H04L 1/1861
370/338
(Continued)

FOREIGN PATENT DOCUMENTS

CN 102378387 A 3/2012
CN 103209483 A 7/2013
(Continued)

OTHER PUBLICATIONS

IP Office of P.R. China—International Search Report of the International Searching Authority (with English Translation) dated Nov. 14, 2016 for International Application No. PCT/CN2016/094975 (7 pgs).
(Continued)

Primary Examiner — Michael Thier
Assistant Examiner — Nevena Zecevic Sandhu
(74) Attorney, Agent, or Firm — Womble Bond Dickinson (US) LLP

(57) ABSTRACT

The present application provides a PUCCH-based uplink control information transmission method and apparatus. User equipment determines, according to downlink control information (DCI), a format of a physical uplink control channel (PUCCH) and/or information of a used orthogonal sequence; and the user equipment transmits, according to the format of the PUCCH and/or the information of the used orthogonal sequence, uplink control information borne by
(Continued)

A UE determines a format of, and/or information about an orthogonal sequence to be used by a PUCCH, according to DCI ⟵ 301

The UE transmits uplink control information carried in the PUCCH according to the format of, and/or the information about the orthogonal sequence to be used by the PUCCH ⟵ 302 the PUCCH. The present application can implement selection of a transmission structure of a PUCCH to transmit uplink control information.

24 Claims, 5 Drawing Sheets

(52) U.S. Cl.
CPC ......... *H04W 72/0446* (2013.01); *H04L 5/001* (2013.01); *H04L 5/005* (2013.01); *H04L 5/0048* (2013.01); *H04L 5/0055* (2013.01)

(56) References Cited

U.S. PATENT DOCUMENTS

| | | | |
|---|---|---|---|
| 2013/0128833 A1 | 5/2013 | Lee et al. | |
| 2013/0272258 A1* | 10/2013 | Lee | H04B 7/0413 370/329 |
| 2014/0161060 A1 | 6/2014 | Nam et al. | |
| 2014/0219202 A1 | 8/2014 | Kim et al. | |
| 2014/0362792 A1 | 12/2014 | Cheng et al. | |
| 2014/0362797 A1* | 12/2014 | Aiba | H04L 1/0026 370/329 |
| 2015/0208403 A1* | 7/2015 | Takeda | H04L 1/00 370/329 |
| 2015/0264678 A1 | 9/2015 | Yin et al. | |
| 2016/0135193 A1* | 5/2016 | Zhang | H04W 52/04 370/329 |
| 2017/0041911 A1* | 2/2017 | Yamamoto | H04B 1/707 |
| 2018/0145796 A1* | 5/2018 | Liang | H04L 1/1812 |

FOREIGN PATENT DOCUMENTS

| | | | |
|---|---|---|---|
| CN | 103384183 | A | 11/2013 |
| CN | 103684705 | A | 3/2014 |
| EP | 3297193 | A1 | 3/2019 |
| JP | 2013507067 | A | 2/2013 |
| JP | 2013187818 | A | 9/2013 |
| JP | 2015139106 | A | 7/2015 |
| WO | 2011041623 | A1 | 4/2011 |
| WO | 2011135795 | A1 | 11/2011 |
| WO | 2015083566 | A1 | 6/2015 |

OTHER PUBLICATIONS

IP Office of P.R. China—Written Opinion of the International Searching Authority dated Nov. 14, 2016 for International Application No. PCT/CN2016/094975 (3 pgs).
Huawei: "PUCCH Resource Allocation", 3GPP TSG RAN WG1 Meeting #82 R1-154335, Beijing, China, Aug. 2015, XP051039456A, 4 pages.
Extended European Search Report for European Patent Application No. 16847944.2, dated Sep. 10, 2018, 9 pages.
The first Office Action Japanese Patent Application No. 2018515820, dated Mar. 26, 2018; 8 pages.
Ericsson, "PUCCH resource allocation for Rel-13 CA enhancement," 3GPP TSG RAN WG1 Meeting #82, Aug. 24-28, 2015, 2 pages, R1-154425.
The First Office Action for Chinese Application No. 201510624635.3 dated Dec. 28, 2018, 12 pages, [English Translation].
The European Office Action for Application No. 16847944.2 dated Oct. 15, 2019, 10 pages.
The International Preliminary Report on Patentability for PCT Application No. PCT/CV2016/094975 dated Mar. 27, 2018, 9 pages, [English Translation].

* cited by examiner

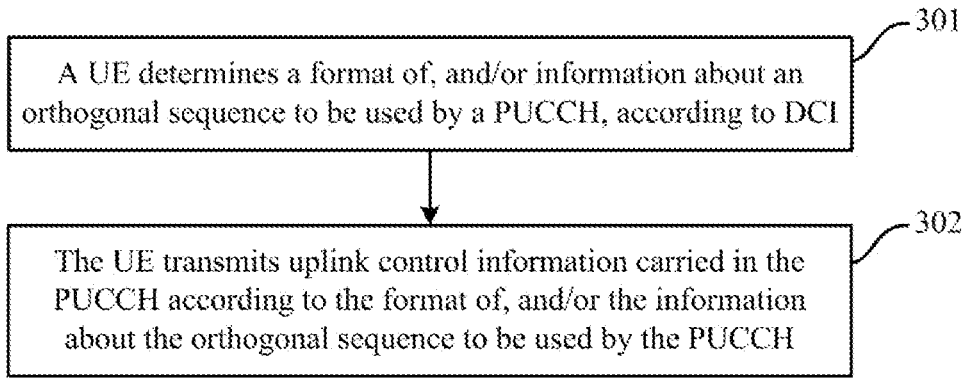

301 A UE determines a format of, and/or information about an orthogonal sequence to be used by a PUCCH, according to DCI 302 The UE transmits uplink control information carried in the PUCCH according to the format of, and/or the information about the orthogonal sequence to be used by the PUCCH

Fig.3

Downlink Assignment Index (DAI), Total Downlink Assignment Index (DAI) in Component Carrier (CC)/sub-frame

Fig.4

PUCCH-BASED UPLINK CONTROL INFORMATION TRANSMISSION METHOD AND APPARATUS

CROSS-REFERENCE TO RELATED APPLICATIONS

This patent application is a U.S. National Phase application under 35 U.S.C. § 371 of International Application No. PCT/CN2016/094975, filed on 12 Aug. 2016, entitled PUCCH-BASED UPLINK CONTROL INFORMATION TRANSMISSION METHOD AND APPARATUS, which claims priority to Chinese Patent Application No. 20150624635.3, filed with the Chinese Patent Office on Sep. 25, 2015, and entitled "A method and apparatus for transmitting uplink control information based on PUUCH", the contents of which claims was incorporated by reference in its entirety.

FIELD

The present disclosure relates to the field of wireless communications, and particularly to a method and apparatus for transmitting uplink control information (UCI) based on physical uplink control channel (PUCCH).

BACKGROUND

In a carrier aggregation (CA) system of the long term evolution-advanced (LTE-A) release (Rel)-10, aggregation of at most five carriers is supported, and a PUCCH format 3 is defined correspondingly. The PUCCH format 3 can carry UCI of at most 22 bits. In a CA system of subsequent LTE-A releases, aggregation of at most 32 carriers is supported, and a new PUCCH format having a higher capacity is defined correspondingly to carry more UCI.

PUCCHs of different transmission structures are introduced to the system, but a solution to selecting a PUCCH of a proper transmission structure for transmitting UCI has been absent so far.

SUMMARY

An embodiment of the disclosure provide a method and apparatus for transmitting UCI based on PUCCH so as to select a PUCCH transmission structure for transmitting UCI.

The embodiment of the disclosure provides a method for transmitting UCI based on PUCCH. The method includes the following operations: determining, by a user equipment (UE), a format of a PUCCH and/or information about an orthogonal sequence to be used by the PUCCH, according to downlink control information (DCI); and transmitting, by the UE, UCI carried in the PUCCH according to, the format of the PUCCH and/or the information about the orthogonal sequence to be used by the PUCCHUCI.

The embodiment of the disclosure provides another method for transmitting UCI based on PUCCH. The method includes the following operations: transmitting, by a base station, downlink control information (DCI) for indicating, a format of a PUCCH and/or information about an orthogonal sequence to be used by the PUCCH; and receiving, by the base station, UCI carried in the PUCCH according to, the format of the PUCCH and/or the information about the orthogonal sequence to be used by the PUCCH, corresponding to the DCI.

The embodiment of the disclosure provides a UE. The UE includes a transmitter, a processor and a memory storing at least one instruction. The processor is configured to execute the at least one instruction to: determine, a format of a PUCCH and/or information about an orthogonal sequence to be used by the PUCCH, according to DCI: and control the transmitter to transmit UCI carried in the PUCCH according to, the format of the PUCCH and/or the information about the orthogonal sequence to be used by the PUCCH.

The embodiment of the disclosure provides a base station. The base station includes a transceiver, a processor and a memory storing at least one instruction. The processor is configured to execute the at least one instruction to: control the transceiver to: transmit DCI for indicating, a format of a PUCCH and/or information about an orthogonal sequence to be used by the PUCCH; and control the transceiver to receive UCI carried in the PUCCH according to, the format of the PUCCH and/or the information about the orthogonal sequence to be used by the PUCCH, corresponding to the DCI.

According to the embodiment of the disclosure, the UE determines a format of a PUCCH according to DCI and transmits UCI carried in the PUCCH according to the determined format of the PUCCH, and/or, the UE determines information about an orthogonal sequence to be used by the PUCCH according to the DCI and transmits the UCI carried in the PUCCH according to the determined information about the orthogonal sequence to be used by the PUCCH, thereby achieving the purposes of selecting a PUCCH transmission structure based upon the DCI, and transmitting the UCI according to the selected PUCCH transmission structure.

BRIEF DESCRIPTION OF THE DRAWINGS

In order to make the technical solutions of the embodiment of the disclosure more apparent, the drawings to which reference is to be made in a description of the embodiment are briefly introduced below. Apparently the drawings described below are merely illustrative of one embodiment of the disclosure, and those ordinarily skilled in the art can derive from these drawings other drawings without any inventive effort.

FIG. 3 is a schematic flow chart of PUCCH transmission at a UE's side according to an embodiment of the disclosure.

FIG. 4 is a schematic diagram of determining a quantity of UCI feedback bits according to a downlink assignment index (DAI) according to the embodiment of the disclosure.

DETAILED DESCRIPTION OF AN EMBODIMENT

Figure 1:
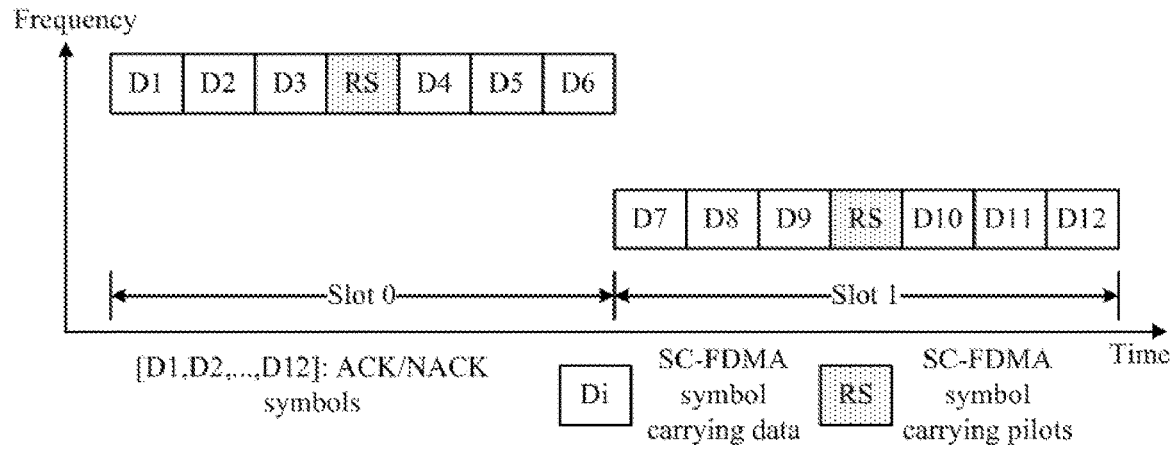
FIG. 1 and FIG. 2 are schematic diagrams of new PUCCH formats carrying feedback information of more than five aggregated carriers, respectively.
Figure 2:
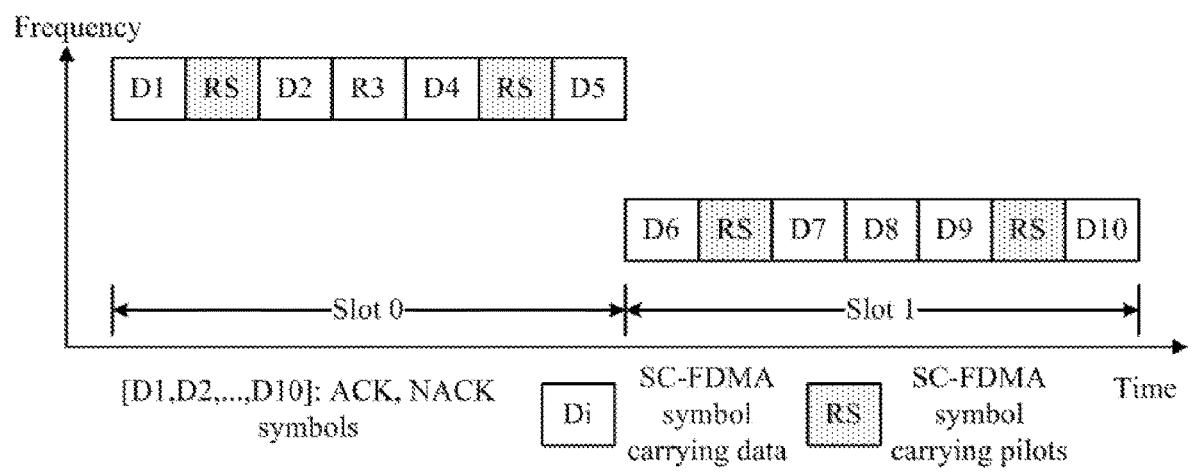

As introduced in the Background section, the PUCCH format for transmitting acknowledgement/non-acknowledgement (ACK/NACK) as defined in the earlier release failed to satisfy the demand for transmitting more ACK/NACK feedback bits, so new PUCCH formats with larger capacities emerged, e.g., a new PUCCH format based upon a physical uplink shared channel (PUSCH) structure as illustrated in FIG. 1, or a new PUCCH format based upon the structure of the PUCCH format 3 as illustrated in FIG. 2. The PUCCH formats illustrated in FIG. 1 and FIG. 2 primarily differ in their different quantities of pilot symbols in a timeslot.

In FIG. 1 and FIG. 2, Di represents an i-th symbol sequence. When one of the abovementioned new PUCCH formats is transmitted using only one physical resource block (PRB) in the frequency domain, 12 symbols in each Di are mapped respectively onto 12 sub-carriers of a single carrier-frequency division multiple access (SC-FDMA) symbol. On the assumption that a PUCCH is transmitted using only one PRB, when only one pilot symbol exists in a timeslot with a normal cyclic prefix (CP) and the quadrature phase-shift keying (QPSK) modulation scheme is applied, the new PUCCH format may carry 288 bits of encoded information, i.e., 144 modulation symbols, and the new PUCCH format based upon the structure of the PUCCH format 3 may carry 240 bits of encoded information, i.e., 120 modulation symbols.

As many as 32 carriers are not always aggregated for a UE, and the UE may use the single-transport block (TB) or a multi-TB transmission mode; and furthermore a quantity of carriers actually scheduled for the UE is always less than or equal to a quantity of configured carriers, so quantities of bits of ACK/NACK fed back by the UE in different sub-frames under different configuration conditions are different. When multi-carrier periodical channel state information (CSI) is transmitted by using a new PUCCH format, since the CSI only feeds back for active carriers, a quantity of active carriers may vary over time, and there are different numbers of feedback bits for different report modes of periodical CSI, there are also different numbers of bits for periodical CSI in different sub-frames under different configuration conditions. When both ACK/NACK and periodical CSI are transmitted in the new PUCCH format, since the periodical CSI is not present in every sub-frame, and there are different numbers of feedback bits for periodical CSI dependent upon different numbers of active carriers and different report modes of periodical CSI, there are also different total numbers of UCI bits in different sub-frames under different configuration conditions. In view of this, if 288 encoded bits are always used for transmission, there is a varying code rate for different numbers of ACK/NACK feedback bits or different values of the quantity of UCI feedback bits, causing significant redundancy of the code rate. For example, the code rate is ½ for 144 bits of UCI (which may be a quantity of bits for ACK/NACK, or for periodical CSI, or for ACK/NACK and periodical CSI), ⅓ for 96 bits of UCI, and ¼ for 72 bits of UCI. When the code rate is so low that it exceeds a demand for transmission performance, redundant code transmission occurs, thus degrading the transmission efficiency. Accordingly, it has been further proposed to define orthogonal sequences with different lengths for new PUCCH formats, and in the case that there are a small number of bits to be transmitted, orthogonal spread sequences can be used to support transmission in the same PRB by multiple UEs and to improve the code rate, so as to improve the transmission efficiency and the utilization ratio of system resources.

So far a solution to supporting ACK/NACK feedback of multiple bits with more than five carriers aggregated has been absent. A solution to dynamically selecting from multiple PUCCH transmission structures according to specific situations to select a suitable PUCCH transmission scheme has also been absent.

In view of this challenge, an embodiment of the disclosure provides a UCI transmission scheme based on PUCCH, where a PUCCH transmission structure, e.g., a format of and/or information about an orthogonal sequence to be used by the PUCCH, can be determined according to DCI so as to transmit UCI carried in the PUCCH according to the determined PUCCH transmission structure.

Firstly an orthogonal sequence to be used by a PUCCH and a format of the PUCCH according to the embodiment of the disclosure are introduced below.

(I) The Length of an Orthogonal Sequence

The length of the orthogonal sequence to be used by the PUCCH is represented as $N_{SF}^{PUCCH}$.

In an implementation, when a new PUCCH format is spread orthogonally in the frequency domain, $N_{SF}^{PUCCH}$ is a positive integer divisible by M, where M is a quantity of sub-carriers occupied by a PRB, and M is a positive integer. For example, when 12 sub-carriers are occupied by a PRB, the value of $N_{SF}^{PUCCH}$ may be one of 1, 2, 3, 4, and 6, where lengths of all or a part of orthogonal sequences corresponding to single-carrier frequency division multiple access (SC-FDMA) symbols for transmitting a PUCCH may be the same or different, and the orthogonal sequences may the same or may be different. When a new PUCCH format is spread orthogonally in the time domain, $N_{SF}^{PUCCH}$ is a positive integer divisible by M1, where M1 is a quantity of SC-FDMA symbols, for carrying data, in a sub-frame or a timeslot, and M1 is a positive integer. For example, given a normal CP, suppose only one SC-FDMA symbol in each timeslot is configured for carrying a pilot, then a timeslot includes six SC-FDMA symbols for carrying data, in, and the value of $N_{SF}^{PUCCH}$ may be one of 1, 2, 3, 4 and 6, where the lengths of orthogonal sequences corresponding to different timeslots in the same sub-frame may the same or may be different; and for example. Given a normal CP, suppose only one SC-FDMA symbol in each timeslot is configured for carrying a pilot, when a truncated PUCCH is used, that is, the last SC-FDMA symbol is spared for transmitting an SRS, then the first timeslot in a sub-frame is the same as described above, but the second timeslot only includes five SC-FDMA symbols, for carrying data, and the value of $N_{SF}^{PUCCH}$ may be 1 or 5. Or, when a timeslot includes five SC-FDMA symbols for carrying data, different sets of SC-FDMA symbols in a timeslot may be configured to use $N_{SF}^{PUCCH}$ having different lengths. For example, a set of the first to third SC-FDMA symbols for carrying data uses an orthogonal sequence with $N_{SF}^{PUCCH}=3$ and a set of the fourth and fifth SC-FDMA symbols for carrying data uses an orthogonal sequence with $N_{SF}^{PUCCH}=2$.

(II) The Index of an Orthogonal Sequence

In the abovementioned spreading scheme in the time domain or the frequency domain, a set of orthogonal sequences having a length of $N_{SF}^{PUCCH}$ includes $N_{SF}^{PUCCH}$ orthogonal sequences, and each orthogonal sequence is identified by an orthogonal sequence index.

(III) The Format of the PUCCH

PUCCH format(s) can include one or more of the PUCCH format 2, the PUCCH format 3, and the new PUCCH formats. A new PUCCH format can be a PUCCH format defined to carry feedback information for more than five aggregated carriers, e.g., the new format based upon a PUCSH structure (as illustrated in FIG. 1), or the structure of the PUCCH format 3 (as illustrated in FIG. 2) as described above.

The embodiment of the disclosure is described below in details with reference to the drawings.

In the following embodiment, indication fields in DCI are referred to as a first indication field, a second indication field, etc., only for the purpose of distinguishing the indication fields in the DCI from each other without any special meaning.

FIG. 3 illustrates a schematic flow chart of transmitting UCI based on PUCCH according to the embodiment of the disclosure. The flow can be performed at a UE's side.

As illustrated, the flow can include the following operation 301 and operation 302.

In the operation 301, the UE determines a format of a PUCCH and/or information about an orthogonal sequence to be used by the PUCCH, according to DCI.

Here the information about the orthogonal sequence includes an orthogonal sequence length and/or an orthogonal sequence index, and a set of orthogonal sequences corresponding to of orthogonal sequence lengths is predefined.

In the operation 302, the UE transmits UCI carried in the PUCCH according to the format of the PUCCH and/or the information about the orthogonal sequence by the PUCCH.

Here the orthogonal sequence to be used by the PUCCH can be used for spreading the UCI carried in the PUCCH in the time and/or frequency domain.

In the flow above, if the format of the PUCCH determined in the operation 301 is the PUCCH format 3, then in the operation 302 the UCI may be transmitted according to a quantity of UCI feedback bits corresponding to the new PUCCH format. Particularly when the selected PUCCH format is the PUCCH format 3, ACK/NACK feedback information in the PUCCH format 3 is generated by generating the ACK/NACK feedback information in the new PUCCH format. For example, the ACK/NACK feedback information is generated according to a corresponding time/frequency-domain counter and indication information of the total number of ACK/NACK bits, in a DAI, where the size of the ACK/NACK feedback information may vary dynamically under different scheduling conditions.

As can be apparent from the description above, the UE determines a format of a PUCCH according to DCI and transmits UCI carried in the PUCCH according to the determined format of the PUCCH, and/or, the UE determines information about an orthogonal sequence to be used by the PUCCH according to the DCI and transmits the UCI carried in the PUCCH according to the determined information about the orthogonal sequence to be used by the PUCCH, thereby achieving the purposes of selecting a PUCCH transmission structure based upon the DCI, and transmitting the UCI according to the selected PUCCH transmission structure.

There may be a number of implementations of the operation 301, and several of them are described below, which are referred to as a first scheme, a second scheme and a third scheme.

First Scheme

In the operation 301, the UE can obtain the format of the PUCCH and/or the information about the orthogonal sequence to be used by the PUCCH, according to a first indication field in the DCI.

In the first scheme, when a number of orthogonal sequence lengths are supported in the system, and the first indication field does not include any information indicating an orthogonal sequence, an orthogonal sequence length can be obtained implicitly according to the PUCCH format. For example, each PUCCH format corresponds to an orthogonal sequence with a unique length, so when a PUCCH format is determined, a length of an orthogonal sequence to be used by the PUCCH format is determined. Or the information about the orthogonal sequence corresponding to the PUCCH format can be indicated in an indication field in the DCI. Or the information about the orthogonal sequence corresponding to the PUCCH format can be preconfigured in higher-layer signaling.

The first scheme is described below in connection with several particular examples thereof.

In a first example, the PUCCH format 3 and one new PUCCH format are defined in the system, and the new PUCCH format does not use any orthogonal sequence. Then the PUCCH format 3 or the new PUCCH format can be indicated in a 1-bit indication field in the DCI.

In a second example, the PUCCH format 3 and two new PUCCH formats are defined in the system, where transmission structures (e.g., quantities of RS symbols, quantities of PRBs to be occupied, etc.) of the different new PUCCH formats are different, and the new PUCCH formats do not use any orthogonal sequences. Then a new PUCCH format 1 or a new PUCCH format 2 to be used can be indicated in a 1-bit indication field in the DCI; or the PUCCH format 3, or a new PUCCH format 1 or a new PUCCH format 2 to be used can be indicated in a 2-bit indication field in the DCI.

In a third example, the PUCCH format 3 and one new PUCCH format are defined in the system, and the new PUCCH format may use orthogonal sequences with N lengths. Then: in one approach, an orthogonal sequence with a specific length to be used is indicated in a $\lceil \log_2 N \rceil$-bit indication field in the DCI, where $\lceil \cdot \rceil$ represents the ceiling function; in another approach, the PUCCH format 3 or the new PUCCH format and an orthogonal sequence with a specific length corresponding to the PUCCH format 3 when the new PUCCH format is to be used are indicated in a $\lceil \log_2 N+1 \rceil$-bit indication field in the DCI; and in still another approach, the PUCCH format 3 or the new PUCCH format is indicated in a 1-bit indication field in the DCI, and when the new PUCCH format is to be used, an orthogonal sequence with a specific length is indicated in a $\lceil \log_2 N \rceil$-bit indication field in the DCI.

In a fourth example, the PUCCH format 3 and two new PUCCH formats are defined in the system. A new PUCCH format 1 (with a quantity a1 of pilot symbols) does not use any orthogonal sequence (or the orthogonal sequence length is 1). A new PUCCH format 2 (with a quantity a2 of pilot symbols) may use orthogonal sequences with N lengths (e.g., $N_{SF,1}^{PUCCH}, N_{SF,2}^{PUCCH}, N_{SF,3}^{PUCCH}, \ldots$). Then: in one approach, the new PUCCH format 1 or the new PUCCH format 2 is indicated in a 1-bit indication field, and an orthogonal sequence with a specific length is indicated in a $\lceil \log_2 N \rceil$-bit indication field in the DCI; and in another approach, the PUCCH format 3 or the new PUCCH format 1 or the new PUCCH format 2 is indicated in a 2-bit indication field, and an orthogonal sequence with a specific length is indicated in a $\lceil \log_2 N \rceil$-bit indication field in the DCI.

In a fifth example, the PUCCH format 3 and a quantity A of new PUCCH formats are defined in the system, where transmission structures and/or orthogonal sequence lengths for the different new PUCCH formats are different. For example, a new PUCCH format 1 (with a quantity a1 of pilot symbols) does not use any orthogonal sequence (or the orthogonal sequence length is 1), a new PUCCH format 2 (with a quantity a2 of pilot symbols) uses an orthogonal sequence with a length of $N_{SF,1}^{PUCCH}$, a new PUCCH format 3 (including a quantity a2 of pilot symbols) uses an orthogonal sequence with a length of $N_{SF,2}^{PUCCH}$ . . . . Then: in one approach, a new PUCCH format (including a transmission structure and a length of an orthogonal sequence) is indicated in a $\lceil \log_2 A \rceil$-bit indication field in the DCI; and in another approach, the PUCCH format 3 or a new PUCCH format (including a transmission structure and a length of an orthogonal sequence) is indicated in a $\lceil \log_2 A+1 \rceil$-bit indication field in the DCI.

In the third, fourth, or fifth example above, a sequence index of an orthogonal sequence with a currently configured length can be indicated in $\lceil \log_2 B \rceil$ bits, where B is a quantity of orthogonal sequences with a certain length. Or an orthogonal sequence length and an orthogonal sequence index can be indicated jointly (accordingly the bit field to indicate the orthogonal sequence length separately described above is no longer needed). For example, information of indexes of all jointly indexed orthogonal sequences with different orthogonal sequence lengths is indicated using $\lceil \log_2 C \rceil$ bits, where $$C = \sum_{i=1}^{N} N_{SF,i}^{PUCCH},$$

N is a quantity of the different lengths of orthogonal sequences, $N_{SF,i}^{PUCCH}$ is the length of an orthogonal sequence, and is also a quantity of orthogonal sequences with the length of $N_{SF,i}^{PUCCH}$. Or an orthogonal sequence index can be determined directly according to a frequency resource. For example, if the frequency resource is a channel resource index, then the orthogonal sequence index is determined according to the channel resource index and an orthogonal sequence length.

Second Scheme

In the operation 301, the UE can determine a quantity of UCI feedback bits in the current sub-frame according to a second indication field in the DCI, and determine the format of the PUCCH and/or the information about the orthogonal sequence to be used by the PUCCH, according to the quantity of UCI feedback bits in the current sub-frame.

In the second scheme, when a predefined or preconfigured correspondence relationship between the quantity of UCI feedback bits, and the format of the PUCCH and/or the indication information of the orthogonal sequence to be used by the PUCCH, does not include any information about the orthogonal sequence, an orthogonal sequence length can be obtained implicitly according to the PUCCH format. For example, each PUCCH format corresponds to an orthogonal sequence with a unique length, so when a PUCCH format is determined, an orthogonal sequence length to be used by the PUCCH format is determined. Or the information about the orthogonal sequence corresponding to the PUCCH format can be indicated in an indication field in the DCI. Or the information about the orthogonal sequence corresponding to the PUCCH format can be preconfigured in higher-layer signaling.

Particularly in the second scheme, there may be a number of implementations to determine the format of the PUCCH and/or the information about the orthogonal sequence to be used by the PUCCH according to the quantity of UCI feedback bits in the current sub-frame, two of which are given below as a determination approach 1 and a determination approach 2.

(1) Determination Approach 1

In the determination approach 1 of the second scheme, the UE determines the format of the PUCCH and/or the information about the orthogonal sequence to be used by the PUCCH, in the current sub-frame according to the quantity of UCI feedback bits (i.e., the codebook size) in the current sub-frame, and a correspondence relationship between the quantity of UCI feedback bits, and the format of the PUCCH and/or the information about the orthogonal sequence to be used by the PUCCH. The quantity of UCI feedback bits in the current sub-frame, determined according to the second indication field corresponds to an element in a set of values of the quantity of UCI feedback bits. There are N elements in the set of values of the quantity of UCI feedback bits, where each element corresponds to one of the values of the quantity of UCI feedback bits, and each value of the quantity of UCI feedback bits corresponds to a format of a PUCCH and/or information about an orthogonal sequence to be used by the PUCCH. N is a positive integer more than or equal to 2.

In the determination approach 1 of the second scheme, the set of values of the quantity of UCI feedback bits, and the correspondence relationship between, each element in the set of values of the quantity of UCI feedback bits and the format of the PUCCH and/or the information about the orthogonal sequence to be used by the PUCCH, can be predefined. The quantity of UCI feedback bits in the current sub-frame, indicated in the second indication field transmitted by a base station corresponds to an element in the set of values of the quantity of UCI feedback bits, so that the UE can determine the format of the PUCCH and/or the information about the orthogonal sequence to be used by the PUCCH, according to the second indication field in the received DCI.

In an implementation, the N elements in the set of values of the quantity of UCI feedback bits can be one of the following: N values of the quantity of UCI feedback bits; N values of a quantity of carriers, where each of the N values of the quantity of carriers corresponds to one of the values of the quantity of UCI feedback bits; N values of a quantity of sub-frames, where each value of the quantity of sub-frames corresponds to one of the values of the quantity of UCI feedback bits; N combinations of carrier data and the quantity of sub-frames, where each combination corresponds to one of the values of the quantity of UCI feedback bits; N carrier sets, where each carrier sets corresponds to one of the values of the quantity of UCI feedback bits; N sub-frame sets, where each s sub-frame sets corresponds to one of the values of the quantity of UCI feedback bits; and N combinations of carrier sets and sub-frame sets, where each combination corresponds to one of the values of the quantity of UCI feedback bits.

Here the set of values of the quantity of UCI feedback bits may be predefined, or may be pre-configured in high-layer signaling, e.g., radio resource control (RRC) signaling. The correspondence relationship between the format of the PUCCH and/or the information about the orthogonal sequence to be used by the PUCCH, and an element in the set of values of the quantity of UCI feedback bits may be predefined, or may be pre-configured in high-layer signaling.

In an implementation, the second indication field further carries scheduling condition indication information, where the scheduling condition indication information includes one or more of a DAI counter, a frequency-domain DAI timer, the total number of time-domain scheduled data packets, and the total number of frequency-domain scheduled data packets. Such information can help the UE to order ACK/NACK feedback information of different carriers and/or sub-frames correctly.

The determination approach 1 in the second scheme is described below in connection with several examples thereof.

M values of the quantity of feedback bits, represented as C1, C2, C3 . . . are predefined or preconfigured in higher-layer signaling in the system. Or M sets of carriers and/or sub-frames, represented as A1, A2, A3 . . . are predefined or preconfigured in higher-layer signaling in the system. Each set corresponds to a value of the quantity of feedback bits. For example, A1 corresponds to C1, A2 corresponds to C2 . . . . A $\lceil \log_2 M \rceil$-bit indication field in the DCI can indicate one of the values of the quantity of feedback bits, Ci, (or when the indication field indicates one of the carrier sets and/or sub-frame sets, it also implicitly corresponds to corresponding value of the quantity of feedback bits), and both the UE and the base station determines the total number of bits for UCI feedback information according to the value of the quantity of feedback bits. That is, at the UE's side, if no downlink data corresponding to Ci bits of feedback information is received, then NACK is generated and filled into the tail of the sequence of feedback information, where the DCI can further include time- and/or frequency-domain counter indication information for arranging ACK/NACK feedback information of different sub-frames and/or carriers. For example, a DAI counter component (i.e., a first DAI component) as illustrated in FIG. 4 represents the sequence number(s) of a data packet scheduled in the current sub-frame in the time and frequency domains. A correspondence relationship between the quantity of UCI feedback bits (or a set of carriers and/or sub-frames), and the format of the PUCCH and/or the information about the orthogonal sequence to be used by the PUCCH is further predefined or preconfigured in higher-layer signaling in the system.

In a first example, the PUCCH format 3 and only one new PUCCH format (which supports no spreading) are defined in the system. Then the UE can obtain the corresponding PUCCH format from Table 1 according to the quantity of feedback information bits.

TABLE 1

Correspondence relationships (e.g., 1-bit indication information) between different values of the quantity of UCI feedback bits and PUCCH formats

| DCI indication information | A quantity of UCI feedback bits | PUCCH format |
|---|---|---|
| 0 | C1 | PUCCH format 3 |
| 1 | C2 | New PUCCH format |

In a second example, the PUCCH format 3 and only two new PUCCH formats (which support no spreading and use different quantities of RS symbols) are defined in the system. Then the UE can obtain the corresponding PUCCH format from Table 2-1 or Table 2-2 according to the quantity of feedback information bits.

TABLE 2-1

Correspondence relationships (e.g., 2-bit indication information) between different values of the quantity of UCI feedback bits and PUCCH formats

| DCI indication information | The quantity of UCI feedback bits | PUCCH format |
|---|---|---|
| 00 | C1 | New PUCCH format 1 |
| 01 | C2 | New PUCCH format 1 |
| 10 | C3 | New PUCCH format 2 |
| 11 | C4 | New PUCCH format 2 |

TABLE 2-2

Correspondence relationships (e.g., 2-bit indication information) between different values of the quantity of UCI feedback bits and PUCCH formats

| DCI indication information | The quantity of UCI feedback bits | PUCCH format |
|---|---|---|
| 00 | C1 | PUCCH format 3 |
| 01 | C2 | New PUCCH format 1 |
| 10 | C3 | New PUCCH format 2 |
| 11 | C4 | New PUCCH format 2 |

In a third example, only the PUCCH format 3 and one new PUCCH format are defined in the system, and orthogonal sequences with N different lengths are used. Then the UE can obtain, information about an orthogonal sequence to be used by the new format from a correspondence relationship as depicted in Table 3-1, or the format of the PUCCH and the information about the orthogonal sequence to be used by the PUCCH from a correspondence relationship as depicted in Table 3-2, or the PUCCH format from the correspondence relationship as depicted in Table 1, and use an orthogonal sequence of a certain length indicated in the $\lceil \log_2 N \rceil$-bit indication field in the DCI.

TABLE 3-1

Correspondence relationships (e.g., 2-bit indication information) between different values of the quantity of UCI feedback bits, and orthogonal sequence information

| DCI indication information | The quantity of UCI feedback bits | PUCCH format |
|---|---|---|
| 00 | C1 | An orthogonal sequence length of $N_{SF,1}^{PUCCH}$ |
| 01 | C2 | An orthogonal sequence length of $N_{SF,2}^{PUCCH}$ |
| 10 | C3 | An orthogonal sequence length of $N_{SF,3}^{PUCCH}$ |
| 11 | C4 | An orthogonal sequence length of $N_{SF,4}^{PUCCH}$ |

TABLE 3-2

Correspondence relationships (e.g., 2-bit indication information) between different values of the quantity of UCI feedback bits, and PUCCH formats and orthogonal sequence information

| DCI indication information | The quantity of UCI feedback bits | PUCCH format |
|---|---|---|
| 00 | C1 | PUCCH format 3 (with a fixed orthogonal sequence length of 5) |
| 01 | C2 | New PUCCH format with an orthogonal sequence length of $N_{SF,1}^{PUCCH}$ |

TABLE 3-2-continued

Correspondence relationships (e.g., 2-bit indication information) between different values of the quantity of UCI feedback bits, and PUCCH formats and orthogonal sequence information

| DCI indication information | The quantity of UCI feedback bits | PUCCH format |
|---|---|---|
| 10 | C3 | New PUCCH format with an orthogonal sequence length of $N_{SF,2}^{PUCCH}$ |
| 11 | C4 | New PUCCH format with an orthogonal sequence length of $N_{SF,3}^{PUCCH}$ |

In a fourth example, when the PUCCH format 3 and two new PUCCH formats are defined in the system, where the two new PUCCH formats use orthogonal sequences with different lengths, the UE can obtain a corresponding new PUCCH format, and information about an orthogonal sequence to be used by the new format, from a correspondence relationship as depicted in Table 4-1 or Table 4-2, according to the quantity of feedback information bits; or can obtain the PUCCH format from a correspondence relationship as depicted in Table 1 or 2-2 according to the quantity of feedback information bits, and obtain the specific length of the orthogonal sequence to be used, according to the $\lceil \log_2 N \rceil$-bit indication field in the DCI.

TABLE 4-1

Correspondence relationships (e.g., 3-bit indication information) between different values of the quantity of UCI feedback bits, and new PUCCH formats and orthogonal sequence information

| DCI indication information | The quantity of UCI feedback bits | PUCCH format |
|---|---|---|
| 000 | C1 | New PUCCH format 1 (with a fixed orthogonal sequence length of 1) |
| 001 | C2 | New PUCCH format 2 with an orthogonal sequence length of $N_{SF,1}^{PUCCH}$ |
| 010 | C3 | New PUCCH format 2 with an orthogonal sequence length of $N_{SF,2}^{PUCCH}$ |
| 011 | C4 | New PUCCH format 2 with an orthogonal sequence length of $N_{SF,3}^{PUCCH}$ |

TABLE 4-1-continued

Correspondence relationships (e.g., 3-bit indication information) between different values of the quantity of UCI feedback bits, and new PUCCH formats and orthogonal sequence information

| DCI indication information | The quantity of UCI feedback bits | PUCCH format |
|---|---|---|
| 100 | C5 | New PUCCH format 2 with an orthogonal sequence length of $N_{SF,4}^{PUCCH}$ |
| ... | ... | ... |

TABLE 4-2

Correspondence relationships (e.g., 3-bit indication information) between different values of the quantity of UCI feedback bits, and PUCCH formats and orthogonal sequence information

| DCI indication information | The quantity of UCI feedback bits | PUCCH format |
|---|---|---|
| 000 | C1 | PUCCH format 3 (with a fixed orthogonal sequence length of 5) |
| 001 | C2 | New PUCCH format 1 (with a fixed orthogonal sequence length of 1) |
| 010 | C3 | New PUCCH format 2 with an orthogonal sequence length of $N_{SF,1}^{PUCCH}$ |
| 011 | C4 | New PUCCH format 2 with an orthogonal sequence length of $N_{SF,2}^{PUCCH}$ |
| 100 | C5 | New PUCCH format 2 with an orthogonal sequence length of $N_{SF,3}^{PUCCH}$ |
| 101 | C6 | New PUCCH format 2 with an orthogonal sequence length of $N_{SF,4}^{PUCCH}$ |
| ... | ... | ... |

In a fifth example, the PUCCH format 3 and a quantity A of new PUCCH formats are defined in the system, where different new PUCCH formats use different transmission structures and/or orthogonal sequence lengths, then the UE can obtain a corresponding new PUCCH format, and information about an orthogonal sequence to be used by the new format, from a correspondence relationship as depicted in Table 5-1 or Table 5-2, according to the quantity of feedback information bits.

TABLE 5-1

Correspondence relationships (e.g., 3-bit indication information) between different values of the quantity of UCI feedback bits, and PUCCH formats and orthogonal sequence information

| DCI indication information | The quantity of UCI feedback bits | PUCCH format |
|---|---|---|
| 000 | C1 | New PUCCH format 1 (with a quantity a1 of RS symbols, and an orthogonal sequence length of 1) |
| 001 | C2 | New PUCCH format 2 (with a quantity a2 of RS symbols, and an orthogonal sequence length of $N_{SF,1}^{PUCCH}$) |
| 010 | C3 | New PUCCH format 3 (with a quantity a2 of RS symbols, and an orthogonal sequence length of $N_{SF,2}^{PUCCH}$) |
| 011 | C4 | New PUCCH format 4 (with a quantity a2 of RS symbols, and an orthogonal sequence length of $N_{SF,3}^{PUCCH}$) |
| 100 | C5 | New PUCCH format 5 (with a quantity a2 of RS symbols, and an orthogonal sequence length of $N_{SF,4}^{PUCCH}$) |
| ... | ... | ... |

TABLE 5-2

Correspondence relationships (e.g., 3-bit indication information) between different values of the quantity of UCI feedback bits, and PUCCH formats and orthogonal sequence information

| DCI indication information | The quantity of UCI feedback bits | PUCCH format |
|---|---|---|
| 000 | C1 | PUCCH format 3 (with an orthogonal sequence length of 5) |
| 001 | C2 | New PUCCH format 1 (with a quantity a1 of RS symbols, and an orthogonal sequence length of 1) |
| 010 | C3 | New PUCCH format 2 (with a quantity a2 of RS symbols, and an orthogonal sequence length of $N_{SF,1}^{PUCCH}$) |
| 011 | C4 | New PUCCH format (with a quantity a2 of RS symbols, and an orthogonal sequence length of $N_{SF,2}^{PUCCH}$) |
| 100 | C5 | New PUCCH format 4 (with a quantity a2 of RS symbols, and an orthogonal sequence length of $N_{SF,3}^{PUCCH}$) |
| 101 | C6 | New PUCCH format 5 (with a quantity a2 of RS symbols, and an orthogonal sequence length of $N_{SF,4}^{PUCCH}$) |
| ... | ... | ... |

When the quantity of feedback bits exceeds a quantity of combinations of new PUCCH formats and orthogonal sequence lengths, a multi-to-one relationship can be defined, that is, different quantities of feedback bits correspond to the same transmission scheme.

Furthermore a correspondence relationship between a quantity of UCI feedback bits, and a new PUCCH format, an orthogonal sequence length, and an orthogonal sequence index can be defined to determine orthogonal sequence index information as depicted in Table 6, for example. Or an orthogonal sequence index can be determined from a specific indication field in the DCI. Or an orthogonal sequence length and an orthogonal sequence index can be indicated jointly in the DCI, or an orthogonal sequence index can be determined implicitly according to a frequency resource, particularly as described in the first embodiment, so a repeated description thereof is omitted here.

TABLE 6

Correspondence relationships (e.g., 4-bit indication information) between different values of the quantity of UCI feedback bits, and PUCCH formats, orthogonal sequence information

| DCI indication information | The quantity of UCI feedback bits | PUCCH format |
|---|---|---|
| 0000 | C1 | PUCCH format 3 |
| 0001 | C2 | New PUCCH format with an orthogonal sequence length of $N_{SF,1}^{PUCCH}$, and an orthogonal sequence index of 1 |
| 0010 | C2 | New PUCCH format with an orthogonal sequence length of $N_{SF,1}^{PUCCH}$, and an orthogonal sequence index of 2 |
| 0011 | C3 | New PUCCH format with an orthogonal sequence length of $N_{SF,2}^{PUCCH}$, and an orthogonal sequence index of 1 |
| 0100 | C3 | New PUCCH format with an orthogonal sequence length of $N_{SF,2}^{PUCCH}$, and an orthogonal sequence index of 2 |
| 0101 | C3 | New PUCCH format with an orthogonal sequence length of $N_{SF,2}^{PUCCH}$, and an orthogonal sequence index of 3 |
| 0110 | C4 | New PUCCH format with an orthogonal sequence length of $N_{SF,2}^{PUCCH}$, and an orthogonal sequence index of 4 |
| 0111 | C4 | New PUCCH format with an orthogonal sequence length of $N_{SF,3}^{PUCCH}$, an orthogonal sequence index of 1 |
| 1000 | C4 | New PUCCH format with an orthogonal sequence length of $N_{SF,3}^{PUCCH}$, and an orthogonal sequence index of 2 |
| 1001 | C4 | New PUCCH format with an orthogonal sequence length of $N_{SF,3}^{PUCCH}$, and an orthogonal sequence index of 3 |
| 1010 | C4 | New PUCCH format with an orthogonal sequence length of $N_{SF,3}^{PUCCH}$, and an orthogonal sequence index of 4 |
| 1011 | C4 | New PUCCH format with an orthogonal sequence length of $N_{SF,3}^{PUCCH}$, and an orthogonal sequence index of 5 |
| 1100 | C4 | New PUCCH format with an orthogonal sequence length of $N_{SF,3}^{PUCCH}$, and an orthogonal sequence index of 6 |

(2) Determination Approach 2

In the determination approach 2 of the second scheme, the UE determines the format of the PUCCH and/or the information about the orthogonal sequence to be used by the PUCCH, in the current sub-frame according to the quantity of UCI feedback bits in the current sub-frame, and a correspondence relationship between an interval of values of the quantity of UCI feedback bits and the format of the PUCCH and/or the information about the orthogonal sequence to be used by the PUCCH. The quantity of UCI feedback bits in the current sub-frame, indicated in the second indication field in the DCI corresponds to one of M intervals of the values of the quantity of UCI feedback bits, and each interval of the values of the quantity of UCI feedback bits corresponds to, a PUCCH format and/or information about an orthogonal sequence to be used by the PUCCH. M is an integer more than or equal to 2.

The M intervals of the values of the quantity of UCI feedback bits can be predefined, or can be preconfigured in higher-layer signaling. The correspondence relationship between the format of the PUCCH and/or the information about the orthogonal sequence to be used by the PUCCH, and the interval of values of the quantity of UCI feedback bits can be predefined, or can be preconfigured in higher-layer signaling.

When using the determination approach 2 of the second scheme, in a particular implementation, several intervals of values of the quantity of UCI feedback bits, and correspondence relationships between each interval of the values of the quantity of UCI feedback bits, and formats of the PUCCH and/or the information about the orthogonal sequences to be used by the PUCCH can be predefined, or at least one quantity-of-bits threshold, a format of a PUCCH and/or information about an orthogonal sequence to be used by the PUCCH when the quantity of UCI feedback bits exceeds the threshold, and a format of a PUCCH and/or information about an orthogonal sequence to be used by the PUCCH when the quantity of UCI feedback bits does not exceed the threshold can be defined. A quantity of UCI feedback bits in the current sub-frame, indicated in the second indication field in the DCI transmitted by the base station lies in some interval of values of the quantity of UCI feedback bits, so that the UE can determine the format of the PUCCH and/or the information about the orthogonal sequence to be used by the PUCCH, according to the interval of values of the quantity of UCI feedback bits including the quantity of UCI feedback bits indicated in the second indication field in the received DCI.

In an implementation, the second indication field in the DCI carries scheduling condition indication information. The scheduling condition indication information includes one or more of a DAI counter, a frequency-domain DAI timer, the total number of time-domain scheduled data packets, the total number of frequency-domain scheduled data packets, and the total number of time- and frequency-domain scheduled data packets. Such information can help the UE to determine dynamically a quantity of bits for ACK/NACK and other UCI information.

The determination approach 2 above in the second scheme is described below in connection with the following examples thereof.

In a first example, M intervals of values of the quantity of feedback bits, represented as [C1, C2), [C3, C4) . . . are predefined, or preconfigured in higher-layer signaling in the system, and a $\lceil \log_2 M \rceil$-bit indication field in the DCI indicates one of the intervals. A correspondence relationship predefined, or preconfigured in higher-layer signaling in the system is similar to that in the determination approach 1 except that the different values of the quantity of feedback bits are replaced with the intervals of values of the quantity of feedback bits. The DAI indication field in the DCI can indicate a time- and/or frequency-domain counter accumulating a quantity of data packets scheduled in the time- and/or frequency-domain, and can indicate the total number of scheduled data packets, so that the base station and the UE will not understand differently the quantity of UCI feedback bits because the last data packet is lost. Both the UE and the base station obtain the quantity of UCI feedback bits according to a DAI design in the DCI, where the quantity of UCI feedback bits may vary in each varying uplink feedback sub-frame, and is determined by a quantity of data packets scheduled in downlink sub-frames over a downlink carrier for which UCI is fed back in the uplink-sub-frame. As illustrated in FIG. 4, a part of the bit field in the DAI indicates the accumulated numbers of data packets scheduled in the time and frequency domains, and the other part thereof indicates the total number of data packets scheduled by the base station in a configured carrier and downlink sub-frames for which ACK/NACK is fed back in the same uplink-sub-frame. The UE determines 28 bits of UCI to be generated according to the DAI, and then searches the table for a corresponding new PUCCH format and/or orthogonal sequence information according to an interval of values of the quantity of UCI feedback bits including that quantity of UCI bits, particularly as described in the determination approach 1.

In a second example, a quantity-of-bits threshold is predefined as 22 or 23 bits, and a dynamic quantity of UCI feedback bits is determined according to a time- and/or frequency-domain indication field in the DAI. When the quantity of UCI feedback bits exceeds 22 bits, the new PUCCH format is determined to be used; otherwise, the PUCCH format 3 is determined to be used. Or when the quantity of UCI feedback bits does not exceed 23 bits, the PUCCH format 3 is determined; otherwise, the new PUCCH format is determined. When the new PUCCH format is selected, ACK/NACK feedback information to be transmitted may be dynamically determined ACK/NACK feedback information, i.e., a sequence of ACK/NACK feedback bits determined according to the time/frequency-domain count information, the indication information of the total number of bits, etc., in the DCI. When the PUCCH format 3 is selected, ACK/NACK feedback information to be transmitted therein may be ACK/NACK feedback information determined dynamically as described for the new PUCCH format, or, of course, can be feedback information generated based upon a quantity of configured carriers, and/or a quantity of downlink sub-frames corresponding to the current uplink sub-frame (and of course, possibly also transmission modes of the respective carriers), but there may be more than 22 bits thereof, thus failing to be carried or transmitted in the PUCCH format 3.

In the second scheme, the quantity of bits of the ACK/NACK feedback information is dynamically determined according to an indication field in the DCI, and, the PUCCH formation and/or the information about the orthogonal sequence to be used by the PUCCH is determined according to a correspondence relationship between the bits of feedback information and a set of the values of the quantity of bits of feedback information/an interval of values of the quantity of bits of feedback information. As another example, when determining the PUCCH format, whether to use the PUCCH format 3 or the new PUCCH format can be determined according to a fixed quantity of ACK/NACK feedback bits (i.e., the quantity of feedback bits determined according to the quantity of ACK/NACK feedback bits used by the PUCCH format 3). The fixed quantity of ACK/NACK feedback bits is determined according to the number of configured carriers and/or the number of downlink sub-frames corresponding to the current uplink sub-frame. The quantity-of-bits threshold can be predefined as 22 or 23 bits, i.e., when the fixed ACK/NACK feedback bits exceeds 22 bits, the new PUCCH format is selected, otherwise the PUCCH format 3 is selected. When the new PUCCH format is selected, the ACK/NACK feedback information actually transmitted can be ACK/NACK feedback information dynamically determined, i.e., the quantity of feedback bits may be fewer than 22 bits, e.g., a sequence of ACK/NACK feedback bits determined according to the time-/frequency-domain counting information or total number of bits indication information in the DCI. Or feedback information of abovementioned fixed quantity of ACK/NACK feedback bits can be transmitted, i.e., feedback information generated according to the number of configured carriers and/or the number of downlink sub-frames corresponding to the current sub-frame (and also transmission modes of each carrier). When the PUCCH format 3 is selected, the actually transmitted ACK/NACK feedback information may be the feedback information based on the number of configured carriers and/or the number of downlink sub-frames corresponding to the current uplink sub-frame (and also transmission modes of each carrier), or may be ACK/NACK feedback information determined according to the abovementioned methods for the new format.

Third Scheme

In the operation 301, the UE can determine the format of the PUCCH and/or the information about the orthogonal sequence to be used by the PUCCH, according to a DCI length.

In an implementation, this operation can be implemented in one of the following ways.

The UE determines a PUCCH format corresponding to a length of detected DCI, where different DCI lengths correspond to different PUCCH formats.

The UE determines information about an orthogonal sequence corresponding to the length of the detected DCI, where different DCI lengths correspond to information about different orthogonal sequences.

The UE determines a PUCCH format and information about an orthogonal sequence corresponding to the length of the detected DCI, where different DCI lengths correspond to different combinations of PUCCH formats and orthogonal sequences to be used by the PUCCH.

If the DCI detected by the UE is DCI of a first category, then the UE determines a format of a PUCCH and/or an orthogonal sequence to be used by the PUCCH, corresponding to the DCI of the first category, where the PUCCH format corresponding to the DCI of the first category does not support spread transmission, or only supports spread transmission for an orthogonal sequence with a fixed length; and if the DCI detected by the UE is DCI of a second category, then the UE determines a format of a PUCCH and/or an orthogonal sequence to be used by the PUCCH, corresponding to the DCI of the second category, where the PUCCH format corresponding to the DCI of the second category corresponds to information about a plurality of orthogonal sequences, where the length of the DCI of the first category is different from the length of the DCI of the second category.

Here the DCI of the first category can include a third indication field, where the third indication field indicates one of a plurality of PUCCH formats corresponding to the DCI of the first category.

Here the DCI of the second category can include a third indication field, where the third indication field indicates one of a plurality of PUCCH formats corresponding to the DCI of the second category; and/or the DCI of the second category can include a fourth indication field, where the fourth indication field indicates one of the orthogonal sequences with a plurality of lengths corresponding to the DCI of the second category.

In a particular implementation, when a configured PUCCH format does not support spread transmission (i.e., an orthogonal spreading sequence length of 1), or only supports orthogonal spread transmission with a fixed length, the DCI of the first category may be applied, and if there is more than one PUCCH format corresponding to the DCI of the first category, then the DCI includes a third indication field to indicate the PUCCH format corresponding to the category of DCI. When a configured PUCCH format supports orthogonal spreading sequences with a plurality of lengths, the DCI of the second category may be applied, where the length of the DCI of the first category is different from the length of the DCI of the second category. The base station side can select one of the categories of DCI to be transmitted according to actual configuration conditions, where the DCI carries the PUCCH format and the orthogonal sequence information, and the UE can detect blindly whether the DCI belongs to the first category or the second category, and determine the PUCCH format and the orthogonal sequence information according to the detected category of DCI.

In an implementation, when the UE determines the PUCCH format, corresponding to the length of the detected DCI, the DCI includes a fourth indication field, where the fourth indication field indicates the information about the orthogonal sequence to be used by the PUCCH corresponding to the DCI length.

Furthermore when the DCI of the second category does not include any indication field of orthogonal sequence information, the information about the orthogonal sequence to be used by the PUCCH can be preconfigured in higher-layer signaling. Or when the orthogonal sequence information field in the DCI of the second category is just one of the length and the index of the orthogonal sequence, the other one can be preconfigured in higher-layer signaling.

The third scheme is described below with connection with three examples thereof.

In a first example, the PUCCH format 3 and one new PUCCH format are defined in the system, no orthogonal sequence is to be used, and DCI-1 and DCI-2 with different DCI lengths can be defined. When the UE is configured to use the PUCCH format 3, the base station schedules using the DCI-1, and when the UE is configured to use the new PUCCH format, the base station schedules using the DCI-2. The UE can know the PUCCH format to be used, by detecting blindly the different DCI.

In a second example, the PUCCH format 3 and one new PUCCH format are defined in the system. Orthogonal sequences with N lengths of $N_{SF,1}^{PUCCH}$, $N_{SF,2}^{PUCCH}$, $N_{SF,3}^{PUCCH}$, . . . respectively are to be used, and DCI-1 and DCI-2 can be defined. When the UE is configured to use the PUCCH format 3, the base station schedules using the DCI-1, and when the UE is configured to use the new PUCCH format, the base station schedules using the DCI-2, where the DCI-2 further includes a $\lceil \log_2 N \rceil$-bit indication field to indicate a specific length of an orthogonal sequence to be used. The UE can know the PUCCH format and the orthogonal sequence length, to be used, by detecting blindly the different DCI, and detecting the corresponding bit field in the DCI, that is, the UE can determine the orthogonal sequence length of $N_{SF}^{PUCCH}=5$ directly according to the PUCCH format in the case that the DCI-1 is used.

In a third example, the PUCCH format 3 and two new PUCCH formats are defined in the system. A new PUCCH format 1 (with a quantity a1 of pilot symbols) uses no orthogonal sequence (or uses an orthogonal sequence length of 1). A new PUCCH format 2 (with a quantity a2 of pilot symbols) uses orthogonal sequences with N lengths of $N_{SF,1}^{PUCCH}$, $N_{SF,2}^{PUCCH}$, $N_{SF,3}^{PUCCH}$, . . . respectively, DCI-1 and DCI-2 can be defined. When the UE is configured to use the PUCCH format 3 or the new PUCCH format 1, the base station schedules using the DCI-1, where the DCI-1 further includes a 1-bit indication field to indicate the PUCCH format 3 or the new PUCCH format 1 to be used. When the UE is configured to use the new PUCCH format 2, the base station schedules using the DCI-2, where the DCI-2 further includes a $\lceil \log_2 N \rceil$-bit indication field to indicate a specific length of an orthogonal sequence to be used. The UE can know the PUCCH format, and the orthogonal sequence length, to be used, by detecting blindly the different DCI, and detecting the corresponding bit field in the DCI, that is, the UE can determine the orthogonal sequence length directly according to the PUCCH format in the case that the DCI-1 is used. Stated otherwise, when the determined PUCCH format is the PUCCH format 3, the UE can determine the orthogonal sequence length of $N_{SF}^{PUCCH}=5$ directly, and when the determined PUCCH format is the new PUCCH format 1 that does not support orthogonal spreading, then the UE can determine the orthogonal sequence length of $N_{SF}^{PUCCH}=1$ directly.

In the respective examples above of the third scheme, the orthogonal sequence index can be determined in the same way as in the first scheme, so a repeated description thereof is omitted here.

In the respective implementations above of the disclosure, indication information of a frequency resource corresponding to the format of the PUCCH can be indicated in a fifth indication field in the DCI. Or a set of frequency resources corresponding to each format of the PUCCH can be pre-configured, where the set of frequency resources includes at least two frequency resources, and a sixth indication field in the DCI can indicate indication information of an element in the set of frequency resources. Or a frequency resource corresponding to each format of the PUCCH can be configured in higher-layer signaling.

The indication information of the frequency resource corresponding to the format of the PUCCH can include one or more of a quantity of PRBs, the indexes of the PRBs (the indexes of the PRBs can identify the positions of the PRBs in a system bandwidth), and a channel resource index of the PUCCH.

Furthermore if the indication information of the frequency resource corresponding to the format of the PUCCH includes the channel resource index of the PUCCH, then the UE can determine the indexes of the PRBs corresponding to the format of the PUCCH according to the channel resource index of the PUCCH, that is, the indexes of the PRBs corresponding to the format of the PUCCH can be determined according to the channel resource index of the PUCCH.

Particularly the index of a PRB is $n_{PRB}=f(n_{PUCCH}^{(4)}, N_{SF}^{PUCCH})$, that is, $n_{PRB}$ is determined according to the channel resource index $n_{PUCCH}^{(4)}$ of the new PUCCH format, and the orthogonal sequence length $N_{SF}^{PUCCH}$. For example, when hopped transmission of the PUCCH is supported, in an implementation, the indexes of the PRBs corresponding to the PUCCH can be determined in the equation of:

$$n_{PRB} = \begin{cases} \left\lfloor \frac{m}{2} \right\rfloor + N_{RB-N_{SF}^{PUCCH}} & \text{if } (m+n_s \bmod 2) \bmod 2 = 0 \\ N_{RB}^{UL} - 1 - \left\lfloor \frac{m}{2} \right\rfloor - N_{RB-N_{SF}^{PUCCH}} & \text{if } (m+n_s \bmod 2) \bmod 2 = 1 \end{cases} \quad (1)$$

$n_{PRB}$ is the index of a PRB;

$$m = \left\lfloor \frac{n_{PUCCH}^{(4)}}{N_{SF}^{PUCCH}} \right\rfloor,$$

and $\lfloor \cdot \rfloor$ represents floor function; $N_{RB-N_{SF}^{PUCCH}}$ is a PRB starting position corresponding to $N_{SF}^{PUCCH}$ (counted from the lower-frequency side), and this value can be preconfigured in higher-layer signaling; $N_{SF}^{PUCCH}$ is the length of an orthogonal sequence; and $N_{RB}^{UL}$ is a quantity of uplink PRBs.

Or the indexes of the PRBs corresponding to the PUCCH can be determined in the equation of:

$$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases} \quad (2)$$

$n_{PRB}$ is the index of a PRB;

$$m = \left\lfloor \frac{n_{PUCCH}^{(4)}}{N_{SF}^{PUCCH}} \right\rfloor,$$

and $\lfloor \cdot \rfloor$ represents the floor function; $N_{SF}^{PUCCH}$ is the length of an orthogonal sequence; and $N_{RB}^{UL}$ is a quantity of uplink PRBs, that is, the currently indicated $n_{PUCCH}^{(4)}$ is counted from the first PRB assuming each PRB includes a quantity $N_{SF}^{PUCCH}$ of resources, so the index of the current PRB can be obtained directly according to the relationship between this value and $N_{SF}^{PUCCH}$.

Figure 5:
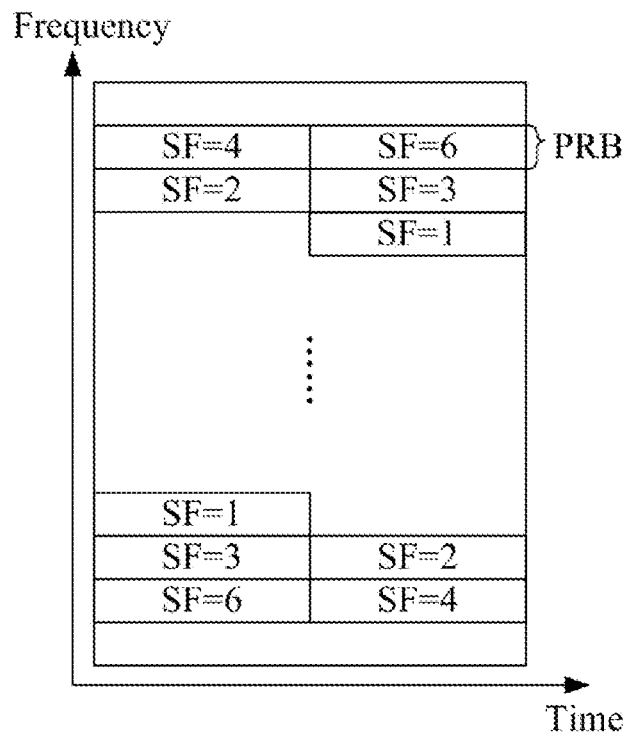
FIG. 5 is a schematic diagram of resource allocation for PUCCHs having different orthogonal sequence lengths according to the embodiment of the disclosure.

In an implementation, the PUCCH spread in the frequency domain using orthogonal sequences with different lengths is configured to be transmitted in different PRBs, or configured to be transmitted in the same PRBs in a multiplexed mode as illustrated in FIG. 5. In FIG. 5, an SF represents an orthogonal sequence, SF=2 represents an orthogonal sequence with the length of 2, and so on. For example, the PUCCH spread in the frequency domain using orthogonal sequences with $N_{SF}^{PUCCH}=2$ and $N_{SF}^{PUCCH}=4$ can be configured in the same PRBs in a multiplexed mode because the orthogonal sequence with $N_{SF}^{PUCCH}=2$ is also orthogonal to the orthogonal sequence with $N_{SF}^{PUCCH}=4$. FIG. 5 illustrates a schematic diagram of resource allocation for a PUCCH spread in the frequency domain using orthogonal sequences with different $N_{SF}^{PUCCH}$.

Furthermore a quantity of PRBs can be determined implicitly according to the quantity of UCI feedback bits. For example, a quantity-of-bits threshold is predefined, and when the quantity of UCI feedback bits exceeds the threshold, the PUCCH is transmitted in two PRBs; otherwise, the PUCCH is transmitted in one PRB. The same will apply if more PRBs are defined for transmission.

Furthermore, in the respective above-mentioned implementations of the disclosure, the length of the orthogonal sequence to be used by the PUCCH can be determined according to the format of the PUCCH, where each format of the PUCCH corresponds to an orthogonal sequence length; or a seventh indication field in the DCI carries the information about the orthogonal sequence corresponding to the format of the PUCCH; or the information about the orthogonal sequence to be used by the PUCCH can be indicated in higher-layer signaling.

Furthermore in the respective implementations above of the disclosure, the index of the orthogonal sequence to be used by the PUCCH is determined according to the channel resource index of the PUCCH. Several rules for determining the index of the orthogonal sequence to be used by the PUCCH are listed below.

A first rule is that the index of the orthogonal sequence to be used by the PUCCH in a sub-frame is determined at least according to the channel resource index of the PUCCH, and the length of the orthogonal sequence to be used by the PUCCH.

Particularly the orthogonal sequence index is $n_{oc}=f(n_{PUCCH}^{(4)}, N_{SF}^{PUCCH})$, where $n_{oc}$ is determined according to the channel resource index $n_{PUCCH}^{(4)}$ of the new PUCCH format and the orthogonal sequence length $N_{SF}^{PUCCH}$. For example, $n_{oc}=n_{PUCCH}^{(4)} \mod N_{SF}^{PUCCH}$, where mod represents a remainder operation. This rule can be applicable to such a scenario that all the SC-FDMA symbols for transmitting data in a sub-frame correspond to orthogonal sequences with the same index.

A second rule is that the index of the orthogonal sequence to be used by the PUCCH in a timeslot in a sub-frame is determined at least according to the channel resource index of the PUCCH, the length of the orthogonal sequence to be used by the PUCCH, and the index of the timeslot.

Particularly the orthogonal sequence index is $n_{oc}=f(n_{PUCCH}^{(4)}, N_{SF}^{PUCCH}, n_s)$, where the index $n_{oc}$ of the orthogonal sequence to be used in a timeslot is determined according to the channel resource index $n_{PUCCH}^{(4)}$ of the new PUCCH format, the orthogonal sequence length $N_{SF}^{PUCCH}$, and the index of the timeslot, $n_s$. This rule can be applicable to such a scenario that SC-FDMA symbols for transmitting data in timeslots with the same timeslot index correspond to orthogonal sequences with the same index, and SC-FDMA symbols for transmitting data in timeslots with different timeslot indexes correspond to different orthogonal sequences.

A third rule is that the index of the orthogonal sequence to be used by the PUCCH in an SC-FDMA symbol, for transmitting the PUCCH, in each timeslot in a sub-frame including the PUCCH is determined at least according to the channel resource index of the PUCCH, the length of the orthogonal sequence to be used by the PUCCH, and the index of the SC-FDMA symbol.

Particularly the orthogonal sequence index is $n_{oc}=f(n_{PUCCH}^{(4)}, N_{SF}^{PUCCH}, l)$, where the index $n_{oc}$ of the orthogonal sequence in an SC-FDMA symbol is determined according to the channel resource index $n_{PUCCH}^{(4)}$ of the new PUCCH format, the orthogonal sequence length $N_{SF}^{PUCCH}$, and the index l of the SC-FDMA symbol. This rule can be applicable to such a scenario that different SC-FDMA symbols, for transmitting data, in the same timeslot correspond to different orthogonal sequences.

A fourth rule is that the index of the orthogonal sequence to be used by the PUCCH in an SC-FDMA symbol, for transmitting the PUCCH, in a timeslot including the PUCCH in a sub-frame is determined at least according to the channel resource index of the PUCCH, the length of the orthogonal sequence to be used by the PUCCH, the index of the timeslot, and the index of the SC-FDMA symbol in the timeslot.

Particularly the orthogonal sequence index is $n_{oc}=f(n_{PUCCH}^{(4)}, N_{SF}^{PUCCH}, n_s, l)$, where the index $n_{oc}$ of the orthogonal sequence in an SC-FDMA symbol in a timeslot is determined according to the channel resource index $n_{PUCCH}^{(4)}$ of the new PUCCH format, the orthogonal sequence length $N_{SF}^{PUCCH}$, the index $n_s$ of the timeslot, and the index l of the SC-FDMA symbol in the timeslot. This rule can be applicable to such a scenario that SC-FDMA symbols in respective timeslots with different indexes correspond to orthogonal sequences with different indexes, and different SC-FDMA symbols, for transmitting data, in the same timeslot correspond to orthogonal sequences with different indexes.

Here the channel resource index of the PUCCH can be indicated in the DCI. For example, the channel resource index of the PUCCH can be indicated in a specific bit field in the DCI. Or the channel resource index of the PUCCH can be indicated in higher-layer signaling. For example, the channel resource index of the PUCCH can be indicated in a specific bit field in the higher-layer signaling. Or the channel resource index of the PUCCH can be indicated jointly in the DCI and higher-layer signaling. For example, the network side preconfigures the UE in the higher-layer signaling with a set of channel resource indexes for the PUCCH, where the set includes at least two groups of channel resource indexes, and each group includes at least one channel resource index, and the network side further indicates one of the groups of channel resource indexes in the set to the UE in a specific bit field in the DCI.

Furthermore, further to the respective implementations above, the method further includes the following operation: the UE determines a set of candidate cyclic shifts according to an interval $\Delta$ of cyclic shifts, selects one of the candidate cyclic shifts in the set, and generates a pilot sequence according to the selected candidate cyclic shift, that is, cyclically shifts pilots in symbols for carrying the pilots in the PUCCH, where the value of $\Delta$ complies the constraint of $$\frac{N_{SC}}{\Delta} \geq N_{SF}^{PUCCH},$$

where Nsc is a quantity of sub-carriers occupied by the PUCCH in the frequency domain, and $N_{SF}^{PUCCH}$ represents the length of the orthogonal sequence; and particularly $\Delta$ can be one of a plurality of values satisfying the constraint above, preconfigured in higher-layer signaling, and a set of cyclic shifts can be determined based upon this value.

Here the cyclic shift can be indicated in higher-layer signaling and/or DCI. For example, the index of the cyclic shift can be indicated in the higher-layer signaling or the DCI; or a set of cyclic shifts can be preconfigured in the higher-layer signaling, and one of the cyclic shifts in the set can be indicated to the UE in the DCI; or the index of a cyclic shift corresponding to the index of the orthogonal sequence can be determined according to the index of the orthogonal sequence, and then the particular cyclic shift can be obtained from a predetermined set of correspondence relationships between indexes and cyclic shifts according to the index. A quantity of cyclic shifts is dependent upon $N_{SF}^{PUCCH}$, and the interval between the respective cyclic shifts is Δ. The cyclic shift can alternatively be determined directly according to the index of the orthogonal sequence.

It shall be noted that the implementations above can be applicable to a scenario in which ACK/NACK, or periodical CSI, or both ACK/NACK and or periodical CSI is transmitted. In the scenario in which CSI is transmitted, the PUCCH format 3 can be replaced with the PUCCH format 2 (no orthogonal spreading in the time domain, i.e., $N_{SF}^{PUCCH}=1$) in the implementations above.

Figure 6:
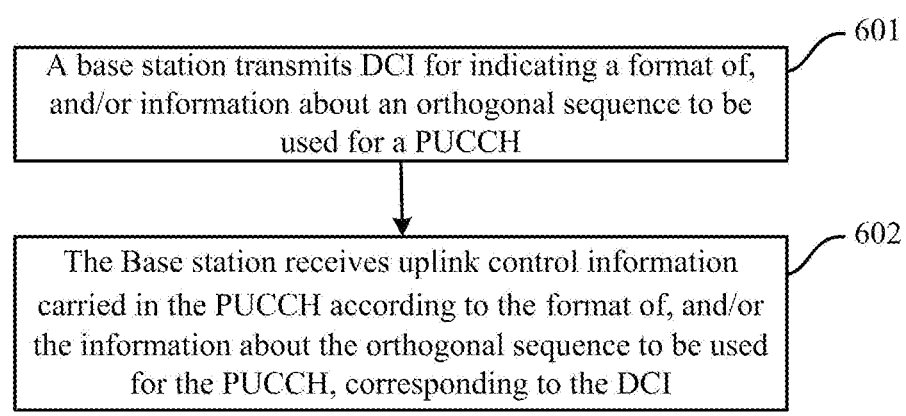
FIG. 6 is a schematic flow chart of PUCCH transmission at a base station's side according to the embodiment of the disclosure.

FIG. 6 illustrates a schematic flow chart of transmitting UCI based on PUCCH according to the embodiment of the disclosure. The flow can be performed at the base station's side, where the flow performed at the base station's side corresponds to the flow as illustrated in FIG. 3, that is, the base station transmits DCI as illustrated in FIG. 6, the UE determines indication information of a format of a PUCCH and/or information about an orthogonal sequence to be used by the PUCCH, according to the DCI, and transmits UCI carried in the PUCCH according to the determined format of, and/or information about the orthogonal sequence to be used by the PUCCH, as illustrated in FIG. 3, and accordingly the base station receives the UCI carried in the PUCCH, so reference can be made to the implementations above for details and a repeated description thereof is omitted here.

As illustrated, the flow can include the following operation 601 to operation 602.

In the operation 601, a base station transmits DCI for indicating a format of a PUCCH and/or information about an orthogonal sequence to be used by the PUCCH.

In the operation 602, the base station receives UCI carried in the PUCCH according to the format of the PUCCH and/or the information about the orthogonal sequence to be used by the PUCCH, corresponding to the DCI.

There may be a number of implementations of the operation 601, several of which are given below, referred to as a fourth scheme, a fifth scheme, and a sixth scheme.

Fourth Scheme

In the fourth scheme, the DCI includes a first indication field, the base station determines the format of the PUCCH and/or the information about the orthogonal sequence to be used by the PUCCH, puts indication information indicating, the format of the PUCCH and/or the information about the orthogonal sequence to be used by the PUCCH, in the first indication field, and transmits the DCI to a user equipment (UE), so that the UE obtains, the format of the PUCCH and/or the information about the orthogonal sequence to be used by the PUCCH, according to the first indication field.

Particularly the quantity of UCI feedback bits in the current sub-frame determined according to a second indication field corresponds to an elements in a set of values of the quantity of UCI feedback bits, the set of values of the quantity of UCI feedback bits includes N elements, each element correspond to a value of the quantity of UCI feedback bits, each value of the quantity of UCI feedback bits correspond to a PUCCH format and/or information about an orthogonal sequence to be used by the PUCCH, and N is a positive integer more than or equal to 2, so that the UE determines the format of the PUCCH and/or the information about the orthogonal sequence to be used by the PUCCH, in the current sub-frame, according to the quantity of UCI feedback bits in the current sub-frame and a correspondence relationship between the quantity of UCI feedback bits, and the format of the PUCCH and/or the information about the orthogonal sequence to be used by the PUCCH.

The N elements in the set of values of the quantity of UCI feedback bits are N values of the quantity of UCI feedback bits. Or the N elements in the set of values of the quantity of UCI feedback bits are N values of a quantity of carriers, where each of the N values of the quantity of carriers corresponds to one of the values of the quantity of UCI feedback bits. Or the N elements in the set of values of the quantity of UCI feedback bits are N values of a quantity of sub-frames, where each value of the quantity of sub-frames corresponds to one of the values of the quantity of UCI feedback bits. Or the N elements in the set of values of the quantity of UCI feedback bits are N combinations of carrier data and the quantity of sub-frames, where each combination corresponds to one of the values of the quantity of UCI feedback bits. Or the N elements in the set of values of the quantity of UCI feedback bits are N sets of carriers, where each set of carriers corresponds to one of the values of the quantity of UCI feedback bits. Or the N elements in the set of values of the quantity of UCI feedback bits are N sets of sub-frames, where each set of sub-frames corresponds to one of the values of the quantity of UCI feedback bits. Or the N elements in the set of values of the quantity of UCI feedback bits are N combinations of carrier sets and sub-frame sets, where each combination corresponds to one of the values of the quantity of UCI feedback bits.

Furthermore, the set of values of the quantity of UCI feedback bits is predefined, or is pre-configured in high-layer signaling. And/or, the correspondence relationship between the format of the PUCCH and/or the information about the orthogonal sequence to be used by the PUCCH, and an element in the set of values of the quantity of UCI feedback bits is predefined, or is pre-configured in high-layer signaling.

Fifth Scheme

In the fifth scheme, the DCI includes a second indication field, the base station puts indication information, for determining a quantity of UCI feedback bits in a current sub-frame, in the second indication field, and transmits the DCI to the UE, so that the UE determines the quantity of UCI feedback bits in the current sub-frame according to the second indication field, and determines, the format of the PUCCH and/or the information about the orthogonal sequence to be used by the PUCCH, according to the quantity of UCI feedback bits in the current sub-frame.

Particularly the quantity of UCI feedback bits in the current sub-frame, indicated by the second indication, corresponds to one of M intervals of the values of the quantity of UCI feedback bits, each interval of the values of the quantity of UCI feedback bits corresponds to, a PUCCH format and/or information about an orthogonal sequence to be used by the PUCCH, and M is an integer more than or equal to 2, so that the UE determines the format of the PUCCH and/or the information about the orthogonal sequence to be used by the PUCCH, in the current sub-frame, according to the quantity of UCI feedback bits in the current sub-frame and a correspondence relationship between the interval corresponding to the quantity of UCI feedback bits, and the format of the PUCCH and/or the information about the orthogonal sequence to be used by the PUCCH.

Here the M intervals of the values of the quantity of UCI feedback bits are predefined, or are preconfigured in higher-layer signaling. And/or, The correspondence relationship between the format of the PUCCH and/or the orthogonal sequence to be used by the PUCCH, and the interval of values of the quantity of UCI feedback bits are predefined, or is preconfigured in higher-layer signaling.

Sixth Scheme

In the sixth scheme, the base station determines the format of the PUCCH and/or the information about the orthogonal sequence to be used by the PUCCH, selects DCI whose length corresponds to the determined PUCCH format and/or information about the orthogonal sequence to be used by the PUCCH, and transmits the DCI to the UE, so that the UE determines the format of the PUCCH and/or the information about the orthogonal sequence to be used by the PUCCH according to the length of the DCI.

Particularly the length of the DCI corresponds to the format of the PUCCH, where different DCI lengths correspond to different PUCCH formats. Or the length of the DCI corresponds to the information about the orthogonal sequence, where different DCI lengths correspond to information about different orthogonal sequences. Or the length of the DCI corresponds to the format of the PUCCH and the information about the orthogonal sequence, where different DCI lengths correspond to different combinations of PUCCH formats and orthogonal sequences to be used by the PUCCH. Or a PUCCH format corresponding to DCI of a first category does not support spread transmission or only supports spread transmission for an orthogonal sequence with a fixed length, and a PUCCH format corresponding to DCI of a second category corresponds to information about a plurality of orthogonal sequences, where a length of the DCI of the first category is different from a length of the DCI of the second category.

Here the DCI of the first category includes a third indication field, where the third indication field indicates one of a plurality of PUCCH formats corresponding to the DCI of the first category.

Furthermore the DCI of the second category includes a third indication field, where the third indication field indicates one of a plurality of PUCCH formats corresponding to the DCI of the second category. And/or, the DCI of the second category includes a fourth indication field, where the fourth indication field indicates one of orthogonal sequences with a plurality of lengths corresponding to the DCI of the second category.

Furthermore when the length of the DCI corresponds to the format of the PUCCH, the DCI includes a fourth indication field, where the fourth indication field indicates the information about the orthogonal sequence to be used by the PUCCH corresponding to the length of the DCI.

Based upon the same technical idea, the embodiment of the disclosure further provides a UE, where the UE can perform the flow of transmitting UCI based on PUCCH according to the implementations above.

Figure 7:
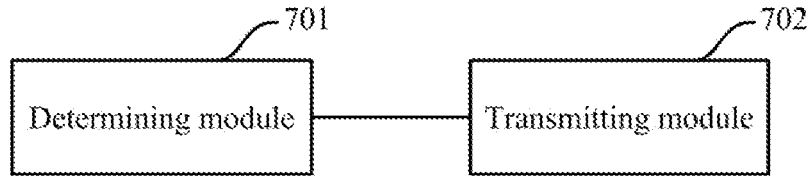
FIG. 7 is a schematic diagram of a UE's structure according to the embodiment of the disclosure.

As illustrated in FIG. 7, the UE according to the embodiment of the disclosure can include a determining module 701 and a transmitting module 702.

The determining module 701 is configured to determine a format of a PUCCH and/or information about an orthogonal sequence to be used by the PUCCH, according to DCI.

The transmitting module 702 is configured to transmit UCI carried in the PUCCH according to the format of the PUCCH and/or the information about the orthogonal sequence to be used by the PUCCH.

In an implementation, the determining module 701 can be configured to: obtain the format of the PUCCH and/or the information about the orthogonal sequence to be used by the PUCCH, indicated by the first indication field in the DCI according to the first indication field as described in the first scheme above; or determine a quantity of UCI feedback bits in the current sub-frame according to a second indication field in the DCI, and to determine the format of the PUCCH and/or the information about the orthogonal sequence to be used by the PUCCH, according to the quantity of UCI feedback bits in the current sub-frame, as described in the second scheme above; or determine the format of the PUCCH and/or the information about the orthogonal sequence to be used by the PUCCH, according to a DCI length as described in the third scheme above.

In an implementation, when the determining module 701 uses the second scheme, the determining module 701 is configured to: determine, the format of the PUCCH and/or the information about the orthogonal sequence to be used by the PUCCH, in the current sub-frame, according to the quantity of UCI feedback bits in the current sub-frame and a correspondence relationship between a quantity of UCI feedback bits, and the format of the PUCCH and/or the information about the orthogonal sequence to be used by the PUCCH, where the quantity of UCI feedback bits in the current sub-frame determined according to the second indication field corresponds to an element in a set of values of the quantity of UCI feedback bits, the set of values of the quantity of UCI feedback bits includes N elements, each element corresponds to one of the values of the quantity of UCI feedback bits, each value of the quantity of UCI feedback bits corresponds to a format of the PUCCH and/or information about an orthogonal sequence to be used by the PUCCH, and N is a positive integer more than or equal to 2.

Here the N elements in the set of values of the quantity of UCI feedback bits are N values of the quantity of UCI feedback bits. Or the N elements in the set of values of the quantity of UCI feedback bits are N values of a quantity of carriers, where each of the N values of the quantity of carriers corresponds to one of the values of the quantity of UCI feedback bits. Or the N elements in the set of values of the quantity of UCI feedback bits are N values of a quantity of sub-frames, where each value of the quantity of sub-frames corresponds to one of the values of the quantity of UCI feedback bits. Or the N elements in the set of values of the quantity of UCI feedback bits are N combinations of carrier data and the quantity of sub-frames, where each combination corresponds to one of the values of the quantity of UCI feedback bits. Or the N elements in the set of values of the quantity of UCI feedback bits are N sets of carriers, where each set of carriers corresponds to one of the values of the quantity of UCI feedback bits. Or the N elements in the set of values of the quantity of UCI feedback bits are N sets of sub-frames, where each set of sub-frames corresponds to one of the values of the quantity of UCI feedback bits. Or the N elements in the set of values of the quantity of UCI feedback bits are N combinations of carrier sets and sub-frame sets, where each combination corresponds to one of the values of the quantity of UCI feedback bit.

Furthermore the set of values of the quantity of UCI feedback bits is predefined, or is pre-configured in high-layer signaling. And/or, the correspondence relationship between the format of the PUCCH and/or the information about the orthogonal sequence to be used by the PUCCH, and the element in the set of values of the quantity of UCI feedback bits is predefined, or is pre-configured in high-layer signaling.

In an implementation, when the determining module 701 uses the second scheme, it can be configured to: determine the format of the PUCCH and/or the information about the orthogonal sequence to be used by the PUCCH, in the current sub-frame, according to the quantity of UCI feedback bits in the current sub-frame and a correspondence relationship between an interval of values of the quantity of UCI feedback bits, and the format of the PUCCH and/or the information about the orthogonal sequence to be used by the PUCCH, the set of values of the quantity of UCI feedback bits includes N elements, each element corresponds to one of the values of the quantity of UCI feedback bits, each value of the quantity of UCI feedback bits corresponds to a format of the PUCCH and/or information about an orthogonal sequence to be used by the PUCCH, and N is a positive integer more than or equal to 2.

Here the M intervals of the values of the quantity of UCI feedback bits are predefined, or are preconfigured in higher-layer signaling. And/or, the correspondence relationship between the format of the PUCCH and/or the information about the orthogonal sequence to be used by the PUCCH, and the interval of the values of the quantity of UCI feedback bits is predefined, or is preconfigured in higher-layer signaling.

In an implementation, when the determining module 701 uses the third scheme, it can be configured to: determine a PUCCH format corresponding to a length of detected DCI, where different DCI lengths correspond to different PUCCH formats. Or determine information about an orthogonal sequence corresponding to the length of the detected DCI, where different DCI lengths correspond to information about different orthogonal sequences. Or determine the PUCCH format and the information about the orthogonal sequence, corresponding to the length of the detected DCI, where different DCI lengths correspond to different combinations of PUCCH formats and orthogonal sequences to be used by the PUCCH. Or when the DCI detected by the UE is DCI of a first category, determine a format of a PUCCH and/or information about an orthogonal sequence to be used by the PUCCH, corresponding to the DCI of the first category, where the PUCCH format corresponding to the DCI of the first category does not support spread transmission or only supports spread transmission for an orthogonal sequence with a fixed length, and when the DCI detected by the UE is DCI of a second category, determine a format of a PUCCH and/or information about an orthogonal sequence to be used by the PUCCH, corresponding to the DCI of the second category, where the PUCCH format corresponding to the DCI of the second category corresponds to information about a plurality of orthogonal sequences, where a length of the DCI of the first category is different from a length of the DCI of the second category.

The DCI of the first category includes a third indication field, where the third indication field indicates one of a plurality of PUCCH formats corresponding to the DCI of the first category.

The DCI of the second category includes a third indication field, where the third indication field indicates one of a plurality of PUCCH formats corresponding to the DCI of the second category. And/or, the DCI of the second category includes a fourth indication field, where the fourth indication field indicates one of orthogonal sequences with a plurality of lengths corresponding to the DCI of the second category.

When the determining module determines the PUCCH format corresponding to the length of the detected DCI, the DCI includes a fourth indication field, where the fourth indication field indicates the information about the orthogonal sequence to be used by the PUCCH corresponding to the DCI length.

In an implementation, the information about the orthogonal sequence includes orthogonal sequence length and/or an orthogonal sequence index, and orthogonal sequences corresponding to each orthogonal sequence length are predefined.

In an implementation, a length of the orthogonal sequence to be used by the PUCCH is determined according to the format of the PUCCH; where each format of the PUCCH corresponds to an orthogonal sequence length, or a seventh indication field in the DCI carries information about the orthogonal sequence corresponding to the format of the PUCCH; or the information about the orthogonal sequence to be used by the PUCCH is indicated in higher-layer signaling.

In an implementation the format of the PUCCH includes one or more of a PUCCH format 2, a PUCCH format 3, and a new PUCCH format.

In an implementation the transmitting module 702 is configured to transmit the UCI carried in the PUCCH according to a quantity of UCI feedback bits corresponding to the new PUCCH format when the determined format of the PUCCH is the PUCCH format 3.

Based upon the same technical idea, the embodiment of the disclosure further provides a UE, where the UE can perform the flow of transmitting UCI based on PUCCH according to the implementations above.

Figure 8:
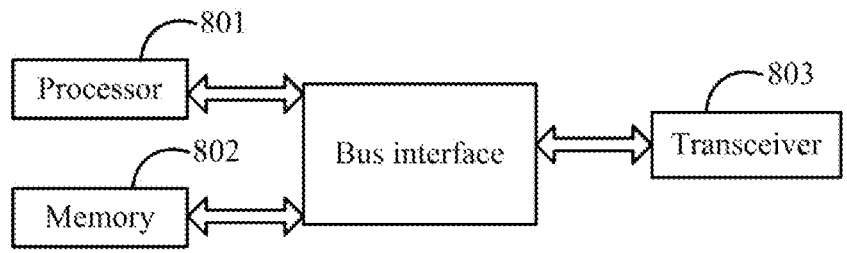
FIG. 8 is a schematic diagram of another UE's structure according to the embodiment of the disclosure.

As illustrated in FIG. 8, the UE can include a processor 801, a memory 802, a transceiver 803, and a bus interface.

The processor 801 is responsible for managing bus architecture and performing normal processes, the memory 802 can store data for use by the processor 801 in operation, and the transceiver 803 is configured to be controlled by the processor 801 to receive and transmit data.

The bus architecture can include any number of interconnecting buses and bridges to particularly link together various circuits including one or more processors represented by the processor 801, and one or more memories represented by the memory 802. The bus architecture can further link together various other circuits, e.g., prophetical devices, manostats, power management circuits, etc., all of which are well known in the art, so a further description thereof will be omitted in this context. The bus interface serves as an interface. The transceiver 803 can be a number of elements including a transmitter and a receiver, which are units for communication with various other devices over a transmission medium. The processor 801 is responsible for managing the bus architecture and performing normal processes, and the memory 802 can store data for use by the processor 801 in performing the operations.

The flow according to the embodiment of the disclosure can be applied to the processor 801, or performed by the processor 801. In an implementation, the respective operations in the flow can be performed by an integrated logic circuit in hardware, or instructions in software, in the processor 801. The processor 801 can be a general-purpose processor, a digital indicate processor, a dedicated integrated circuit, a field programmable gate array, or other programmable logic devices, discrete gates, or transistor logic devices, discrete hardware components to embody or perform the respective methods, operations, and logic block diagrams according to the embodiments of the disclosure. The general-purpose processor can be a microprocessor, any conventional processor, etc. The operations in the method according to the embodiment of the disclosure can be performed directly by a processor in hardware, or modules in hardware and software in the processor in combination. The software modules can reside in a random memory, a flash memory, a read-only memory, a programmable read-only memory, or an electrically erasable, writable and programmable memory, a register, or any other storage medium well known in the art. The storage medium resides in the memory 802, and the processor 801 reads the information in the memory 802, and performs the operations in the flow of spreading and transmitting in combination with the hardware thereof.

Particularly the processor 801 is configured to read and execute program in the memory 802 to: determine a format of a PUCCH and/or information about an orthogonal sequence to be used by the PUCCH, according to DCI; and transmit UCI carried in the PUCCH according to the format of the PUCCH and/or the information about the orthogonal sequence to be used by the PUCCH.

Determining, by the UE, the format of the PUCCH and/or the information about the orthogonal sequence to be used by the PUCCH, according to the DCI includes: obtaining, by the UE, the format of the PUCCH and/or the information about the orthogonal sequence to be used by the PUCCH, indicated by a first indication field in the DCI according to the first indication field; or determining, by the UE, a quantity of UCI feedback bits in a current sub-frame according to a second indication field in the DCI, and determining, by the UE, the format of the PUCCH and/or the information about the orthogonal sequence to be used by the PUCCH, according to the quantity of UCI feedback bits in the current sub-frame; or determining, by the UE, the format of the PUCCH and/or the information about the orthogonal sequence to be used by the PUCCH, according to a DCI length.

Reference can be made to the implementations above for a particular implementation of the flow above, so a repeated description thereof is omitted here.

Based upon the same technical idea, the embodiment of the disclosure further provides a base station, where the base station can perform the flow for transmitting UCI based on PUCCH according to the implementations above.

Figure 9:
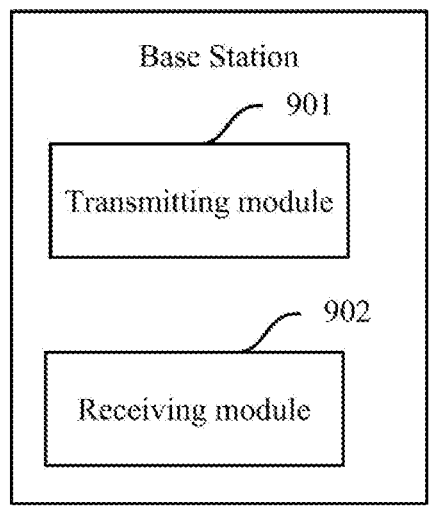
FIG. 9 is a schematic diagram of a base station's structure according to the embodiment of the disclosure.

As illustrated in FIG. 9, a base station according to the embodiment of the disclosure can include a transmitting module 901 and a receiving module 902.

The transmitting module 901 is configured to transmit DCI for indicating a format of a PUCCH and/or information about an orthogonal sequence to be used by the PUCCH.

The receiving module 902 is configured to receive UCI carried in the PUCCH according to the format of the PUCCH and/or the information about the orthogonal sequence to be used by the PUCCH, corresponding to the DCI.

In an implementation of the fourth scheme, the DCI includes a first indication field, the base station determines the format of the PUCCH and/or the information about the orthogonal sequence to be used by the PUCCH, puts indication information indicating, the format of the PUCCH and/or the information about the orthogonal sequence to be used by the PUCCH, in the first indication field, and transmits the DCI to a user equipment (UE), so that the UE obtains, the format of the PUCCH and/or the information about the orthogonal sequence to be used by the PUCCH, according to the first indication field. Or in the fifth scheme, the DCI includes a second indication field, the base station puts indication information, for determining a quantity of UCI feedback bits in a current sub-frame, in the second indication field, and transmits the DCI to the UE, so that the UE determines the quantity of UCI feedback bits in the current sub-frame according to the second indication field, and determines, the format of the PUCCH and/or the information about the orthogonal sequence to be used by the PUCCH, according to the quantity of UCI feedback bits in the current sub-frame. Or in the sixth scheme, the base station determines the format of the PUCCH and/or the information about the orthogonal sequence to be used by the PUCCH, selects DCI corresponding to the determined PUCCH format and/or information about the orthogonal sequence to be used by the PUCCH, and transmits the DCI to the UE, so that the UE determines the format of the PUCCH and/or the information about the orthogonal sequence to be used by the PUCCH according to a length of the DCI.

In an implementation in the fourth scheme, the quantity of UCI feedback bits in the current sub-frame determined according to the second indication field corresponds to an elements in a set of values of the quantity of UCI feedback bits, the set of values of the quantity of UCI feedback bits includes N elements, each element correspond to a value of the quantity of UCI feedback bits, each value of the quantity of UCI feedback bits correspond to a PUCCH format and/or information about an orthogonal sequence to be used by the PUCCH, and N is a positive integer more than or equal to 2, so that the UE determines the format of the PUCCH and/or the information about the orthogonal sequence to be used by the PUCCH, in the current sub-frame, according to the quantity of UCI feedback bits in the current sub-frame and a correspondence relationship between the quantity of UCI feedback bits, and the format of the PUCCH and/or the information about the orthogonal sequence to be used by the PUCCH.

The N elements in the set of values of the quantity of UCI feedback bits are N values of the quantity of UCI feedback bits. Or the N elements in the set of values of the quantity of UCI feedback bits are N values of a quantity of carriers, where each of the N values of the quantity of carriers corresponds to one of the values of the quantity of UCI feedback bits. Or the N elements in the set of values of the quantity of UCI feedback bits are N values of a quantity of sub-frames, where each value of the quantity of sub-frames corresponds to one of the values of the quantity of UCI feedback bits. Or the N elements in the set of values of the quantity of UCI feedback bits are N combinations of carrier data and the quantity of sub-frames, where each combination corresponds to one of the values of the quantity of UCI feedback bits. Or the N elements in the set of values of the quantity of UCI feedback bits are N sets of carriers, where each set of carriers corresponds to one of the values of the quantity of UCI feedback bits. Or the N elements in the set of values of the quantity of UCI feedback bits are N sets of sub-frames, where each set of sub-frames corresponds to one of the values of the quantity of UCI feedback bits. Or the N elements in the set of values of the quantity of UCI feedback bits are N combinations of carrier sets and sub-frame sets, where each combination corresponds to one of the values of the quantity of UCI feedback bits.

Furthermore the set of values of the quantity of UCI feedback bits is predefined, or is pre-configured in high-layer signaling. And/or, the correspondence relationship between the format of the PUCCH and/or the information about the orthogonal sequence to be used by the PUCCH, and an element in the set of values of the quantity of UCI feedback bits is predefined, or is pre-configured in high-layer signaling.

In an implementation in the fifth scheme, the quantity of UCI feedback bits in the current sub-frame, indicated by the second indication, corresponds to one of M intervals of the values of the quantity of UCI feedback bits, each interval of the values of the quantity of UCI feedback bits corresponds to, a PUCCH format and/or information about an orthogonal sequence to be used by the PUCCH, and M is an integer more than or equal to 2, so that the UE determines the format of the PUCCH and/or the information about the orthogonal sequence to be used by the PUCCH, in the current sub-frame, according to the quantity of UCI feedback bits in the current sub-frame and a correspondence relationship between the interval corresponding to the quantity of UCI feedback bits, and the format of the PUCCH and/or the information about the orthogonal sequence to be used by the PUCCH.

Here the M intervals of the values of the quantity of UCI feedback bits are predefined, or are preconfigured in higher-layer signaling. And/or, the correspondence relationship between the format of the PUCCH and/or the orthogonal sequence to be used by the PUCCH, and the interval of values of the quantity of UCI feedback bits are predefined, or is preconfigured in higher-layer signaling.

In an implementation in the sixth scheme, the length of the DCI corresponds to the format of the PUCCH, where different DCI lengths correspond to different PUCCH formats. Or the length of the DCI corresponds to the information about the orthogonal sequence, where different DCI lengths correspond to information about different orthogonal sequences. Or the length of the DCI corresponds to the format of the PUCCH and the information about the orthogonal sequence, where different DCI lengths correspond to different combinations of PUCCH formats and orthogonal sequences to be used by the PUCCH. Or a PUCCH format corresponding to DCI of a first category does not support spread transmission or only supports spread transmission for an orthogonal sequence with a fixed length, and a PUCCH format corresponding to DCI of a second category corresponds to information about a plurality of orthogonal sequences, where a length of the DCI of the first category is different from a length of the DCI of the second category.

Here the DCI of the first category includes a third indication field, where the third indication field indicates one of a plurality of PUCCH formats corresponding to the DCI of the first category.

Here the DCI of the second category includes a third indication field, where the third indication field indicates one of a plurality of PUCCH formats corresponding to the DCI of the second category. And/or, the DCI of the second category includes a fourth indication field, where the fourth indication field indicates one of orthogonal sequences with a plurality of lengths corresponding to the DCI of the second category.

Furthermore when the length of the DCI corresponds to the format of the PUCCH, the DCI includes a fourth indication field, where the fourth indication field indicates the information about the orthogonal sequence to be used by the PUCCH corresponding to the length of the DCI.

In an implementation, the information about the orthogonal sequence includes an orthogonal sequence length and/or an orthogonal sequence index, and orthogonal sequences corresponding to each orthogonal sequence length are predefined.

In an implementation, a length of the orthogonal sequence to be used by the PUCCH is determined according to the format of the PUCCH; where each format of the PUCCH corresponds to an orthogonal sequence length, or a seventh indication field in the DCI carries information about the orthogonal sequence corresponding to the format of the PUCCH; or the information about the orthogonal sequence to be used by the PUCCH is indicated in higher-layer signaling.

In an implementation the format of the PUCCH includes one or more of a PUCCH format 2, a PUCCH format 3, and a new PUCCH format.

In an implementation, the UCI carried in the PUCCH is transmitted according to a quantity of UCI feedback bits corresponding to the new PUCCH format when the determined format of the PUCCH is the PUCCH format 3.

Based upon the same technical idea, the embodiment of the disclosure further provides a base station, where the base station can perform the flow for transmitting UCI based on PUCCH according to the implementations above.

Figure 10:
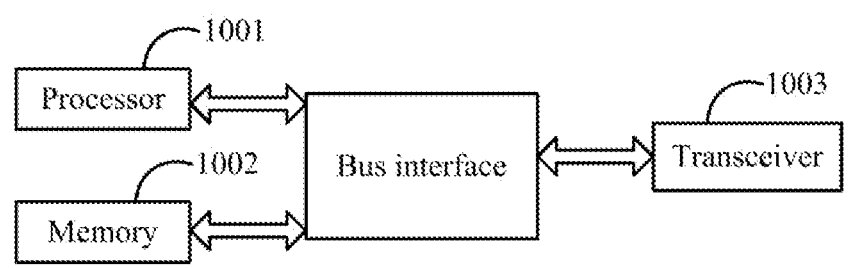
FIG. 10 is a schematic structural diagram of another base station's structure according to the embodiment of the disclosure.

As illustrated in FIG. 10, the base station can include a processor 1001, a memory 1002, a transceiver 1003, and a bus interface.

The processor 1001 is responsible for managing bus architecture and performing normal processes, the memory 1002 can store data for use by the processor 1001 in operation, and the transceiver 1003 is configured to be controlled by the processor 1001 to receive and transmit data.

The bus architecture can include any number of interconnecting buses and bridges to particularly link together various circuits including one or more processors represented by the processor 1001, and one or more memories represented by the memory 1002. The bus architecture can further link together various other circuits, e.g., prophetical devices, manostats, power management circuits, etc., all of which are well known in the art, so a further description thereof will be omitted in this context. The bus interface serves as an interface. The transceiver 1003 can be a number of elements including a transmitter and a receiver, which are units for communication with various other devices over a transmission medium. The processor 1001 is responsible for managing the bus architecture and performing normal processes, and the memory 1002 can store data for use by the processor 1001 in performing the operations.

The flow according to the embodiment of the disclosure can be applied to the processor 1001, or performed by the processor 1001. In an implementation, the respective operations in the flow can be performed by an integrated logic circuit in hardware, or instructions in software, in the processor 1001. The processor 1001 can be a general-purpose processor, a digital indicate processor, a dedicated integrated circuit, a field programmable gate array, or other programmable logic devices, discrete gates, or transistor logic devices, discrete hardware components to embody or perform the respective methods, operations, and logic block diagrams according to the embodiments of the disclosure. The general-purpose processor can be a microprocessor, any conventional processor, etc. The operations in the method according to the embodiment of the disclosure can be performed directly by a processor in hardware, or modules in hardware and software in the processor in combination. The software modules can reside in a random memory, a flash memory, a read-only memory, a programmable read-only memory, or an electrically erasable, writable and programmable memory, a register, or any other storage medium well known in the art. The storage medium resides in the memory 1002, and the processor 1001 reads the information in the memory 1002, and performs the operations in the flow of spreading and transmitting in combination with the hardware thereof.

Particularly the processor 1001 is configured to read and execute a program in the memory 1002 to: transmit DCI for indicating a format of a PUCCH and/or information about an orthogonal sequence to be used by the PUCCH; and receive UCI carried in the PUCCH according to the format of the PUCCH and/or the information about the orthogonal sequence to be used by the PUCCH, corresponding to the DCI.

In an implementation, the DCI includes a first indication field, the base station determines the format of the PUCCH and/or the information about the orthogonal sequence to be used by the PUCCH, puts indication information indicating, the format of the PUCCH and/or the information about the orthogonal sequence to be used by the PUCCH, in the first indication field, and transmits the DCI to a user equipment (UE), so that the UE obtains, the format of the PUCCH and/or the information about the orthogonal sequence to be used by the PUCCH, according to the first indication field. Or the DCI includes a second indication field, the base station puts indication information, for determining a quantity of UCI feedback bits in a current sub-frame, in the second indication field, and transmits the DCI to the UE, so that the UE determines the quantity of UCI feedback bits in the current sub-frame according to the second indication field, and determines, the format of the PUCCH and/or the information about the orthogonal sequence to be used by the PUCCH, according to the quantity of UCI feedback bits in the current sub-frame. Or the base station determines the format of the PUCCH and/or the information about the orthogonal sequence to be used by the PUCCH, selects DCI corresponding to the determined PUCCH format and/or information about the orthogonal sequence to be used by the PUCCH, and transmits the DCI to the UE, so that the UE determines the format of the PUCCH and/or the information about the orthogonal sequence to be used by the PUCCH according to a length of the DCI.

Reference can be made to the embodiment above for a particular implementation of the flow above, so a repeated description thereof will be omitted here.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A method for transmitting uplink control information (UCI) based on physical uplink control channel (PUCCH), comprising:
   determining, by a user equipment (UE), a format of a PUCCH and/or information about an orthogonal sequence to be used by the PUCCH, according to downlink control information (DCI); and
   transmitting, by the UE, UCI carried in the PUCCH according to the format of the PUCCH and/or the information about the orthogonal sequence to be used by the PUCCH;
   wherein determining, by the UE, the format of the PUCCH and/or the information about the orthogonal sequence to be used by the PUCCH, according to the DCI comprises:
   obtaining, by the UE, the format of the PUCCH and the information about the orthogonal sequence to be used by the PUCCH, or the information about the orthogonal sequence to be used by the PUCCH, indicated by a first indication field in the DCI according to the first indication field, wherein the information about the orthogonal sequence comprises an orthogonal sequence length; or
   determining, by the UE, the format of the PUCCH and/or the information about the orthogonal sequence to be used by the PUCCH, according to a number of DCI bits.

2. The method according to claim 1, wherein
   determining, by the UE, the format of the PUCCH and/or the information about the orthogonal sequence to be used by the PUCCH, according to the DCI length comprises:
   determining, by the UE, the format of the PUCCH corresponding to a length of detected DCI, wherein different DCI lengths correspond to different formats of the PUCCH; or
   determining, by the UE, the information about the orthogonal sequence corresponding to the length of the detected DCI, wherein different DCI lengths correspond to information about different orthogonal sequences; or
   determining, by the UE, the format of the PUCCH and the information about the orthogonal sequence, corresponding to the length of the detected DCI, wherein different DCI lengths correspond to different combinations of formats of the PUCCH and orthogonal sequences to be used by the PUCCH; or
   when the DCI detected by the UE is DCI of a first category, then determining the format of the PUCCH and/or the information about the orthogonal sequence to be used by the PUCCH, corresponding to the DCI of the first category, wherein the format of the PUCCH corresponding to the DCI of the first category does not support spread transmission or only supports spread transmission for an orthogonal sequence with a fixed length; and when the DCI detected by the UE is DCI of a second category, then determining the format of the PUCCH and/or the information about the orthogonal sequence to be used by the PUCCH, corresponding to the DCI of the second category, wherein the format of the PUCCH corresponding to the DCI of the second category corresponds to information about a plurality of orthogonal sequences, wherein a length of the DCI of the first category is different from a length of the DCI of the second category.

3. The method according to claim 2, wherein the DCI of the first category comprises a third indication field, wherein the third indication field indicates one of a plurality of formats of the PUCCH corresponding to the DCI of the first category; and/or, the DCI of the second category comprises a fourth indication field, wherein the fourth indication field indicates one of a plurality of formats of the PUCCH corresponding to the DCI of the second category; and/or, the DCI of the second category comprises a fifth indication field, wherein the fifth indication field indicates one of orthogonal sequences with a plurality of lengths corresponding to the DCI of the second category.

4. The method according to claim 2, wherein when the UE determines the format of the PUCCH corresponding to the length of the detected DCI, the DCI comprises a sixth indication field, wherein the sixth indication field indicates the information about the orthogonal sequence to be used by the PUCCH corresponding to the DCI length.

5. The method according to claim 1, wherein the information about the orthogonal sequence comprises an orthogonal sequence length and an orthogonal sequence index, and orthogonal sequences corresponding to each orthogonal sequence length are predefined; and/or, a length of the orthogonal sequence to be used by the PUCCH is determined according to the format of the PUCCH; wherein each format of the PUCCH corresponds to an orthogonal sequence length, or a seventh indication field in the DCI carries information about the orthogonal sequence corresponding to the format of the PUCCH; or the information about the orthogonal sequence to be used by the PUCCH is indicated in higher-layer signaling.

6. The method according to claim 1, wherein the format of the PUCCH comprises one or more of a PUCCH format 2, a PUCCH format 3, and a new PUCCH format; and/or, when the determined format of the PUCCH is the PUCCH format 3, transmitting the UCI carried in the PUCCH according to a quantity of UCI feedback bits corresponding to the new PUCCH format.

7. A method for transmitting uplink control information (UCI) based on physical uplink control channel (PUCCH), comprising:

transmitting, by a base station, downlink control information (DCI) for indicating, a format of a PUCCH and/or information about an orthogonal sequence to be used by the PUCCH; and receiving, by the base station, UCI carried in the PUCCH according to the format of the PUCCH and/or the information about the orthogonal sequence to be used by the PUCCH, corresponding to the DCI;

wherein the DCI comprises a first indication field, the base station determines the format of the PUCCH and the information about the orthogonal sequence to be used by the PUCCH, or the information about the orthogonal sequence to be used by the PUCCH, puts indication information indicating the format of the PUCCH and the information about the orthogonal sequence to be used by the PUCCH, or the information about the orthogonal sequence to be used by the PUCCH, in the first indication field, and transmits the DCI to a user equipment (UE), so that the UE obtains the format of the PUCCH and the information about the orthogonal sequence to be used by the PUCCH, or the information about the orthogonal sequence to be used by the PUCCH, according to the first indication field, wherein the information about the orthogonal sequence comprises an orthogonal sequence length; or the base station determines the format of the PUCCH and/or the information about the orthogonal sequence to be used by the PUCCH, selects DCI whose number of bits corresponds to the determined format of the PUCCH and/or information about the orthogonal sequence to be used by the PUCCH, and transmits the DCI to the UE, so that the UE determines the format of the PUCCH and/or the information about the orthogonal sequence to be used by the PUCCH according to the number of DCI bits.

8. The method according to claim 7, wherein the length of the DCI corresponds to the format of the PUCCH, wherein different DCI lengths correspond to different formats of the PUCCH; or the length of the DCI corresponds to the information about the orthogonal sequence, wherein different DCI lengths correspond to information about different orthogonal sequences; or the length of the DCI corresponds to the format of the PUCCH and the information about the orthogonal sequence, wherein different DCI lengths correspond to different combinations of formats of the PUCCH and orthogonal sequences to be used by the PUCCH; or a format of the PUCCH corresponding to DCI of a first category does not support spread transmission or only supports spread transmission for an orthogonal sequence with a fixed length, and a format of the PUCCH corresponding to DCI of a second category corresponds to information about a plurality of orthogonal sequences, wherein a length of the DCI of the first category is different from a length of the DCI of the second category.

9. The method according to claim 8, wherein the DCI of the first category comprises a third indication field, wherein the third indication field indicates one of a plurality of formats of the PUCCH corresponding to the DCI of the first category; and/or, the DCI of the second category comprises a fourth indication field, wherein the fourth indication field indicates one of a plurality of formats of the PUCCH corresponding to the DCI of the second category; and/or, the DCI of the second category comprises a fifth indication field, wherein the fifth indication field indicates one of orthogonal sequences with a plurality of lengths corresponding to the DCI of the second category.

10. The method according to claim 8, wherein when the length of the DCI corresponds to the format of the PUCCH, the DCI comprises a sixth indication field, wherein the sixth indication field indicates the information about the orthogonal sequence to be used by the PUCCH corresponding to the length of the DCI.

11. The method according to claim 7, wherein the information about the orthogonal sequence comprises an orthogonal sequence length and an orthogonal sequence index, and orthogonal sequences corresponding to each orthogonal sequence length are predefined; and/or,
  a length of the orthogonal sequence to be used by the PUCCH is determined according to the format of the PUCCH; wherein each format of the PUCCH corresponds to an orthogonal sequence length, or a seventh indication field in the DCI carries information about the orthogonal sequence corresponding to the format of the PUCCH; or the information about the orthogonal sequence to be used by the PUCCH is indicated in higher-layer signaling.

12. The method according to claim 7, wherein the format of the PUCCH comprises one or more of a PUCCH format 2, a PUCCH format 3, and a new PUCCH format; and/or,
  when the determined format of the PUCCH is the PUCCH format 3, the UCI carried in the PUCCH is transmitted according to a quantity of UCI feedback bits corresponding to the new PUCCH format.

13. A user equipment, UE, comprising:
  a transmitter;
  a processor;
  a memory storing at least one instruction, wherein the processor is configured to execute the at least one instruction to:
  determine a format of a physical uplink control channel (PUCCH) and/or information about an orthogonal sequence to be used by the PUCCH, according to downlink control information (DCI); and
  control the transmitter to transmit uplink control information (UCI) carried in the PUCCH according to the format of the PUCCH and/or the information about the orthogonal sequence to be used by the PUCCH;
  wherein the processor is further configured to:
  obtain the format of the PUCCH and the information about the orthogonal sequence to be used by the PUCCH, or the information about the orthogonal sequence to be used by the PUCCH, indicated by a first indication field in the DCI according to the first indication field, wherein the information about the orthogonal sequence comprises an orthogonal sequence length; or
  determine the format of the PUCCH and/or the information about the orthogonal sequence to be used by the PUCCH, according to a number of DCI bits.

14. The UE according to claim 13, wherein the processor is further configured to:
  determine the format of the PUCCH corresponding to a length of detected DCI, wherein different DCI lengths correspond to different formats of the PUCCH; or
  determine the information about the orthogonal sequence corresponding to the length of the detected DCI, wherein different DCI lengths correspond to information about different orthogonal sequences; or
  determine the format of the PUCCH and the information about the orthogonal sequence, corresponding to the length of the detected DCI, wherein different DCI lengths correspond to different combinations of formats of the PUCCH and orthogonal sequences to be used by the PUCCH; or
  when the DCI detected by the UE is DCI of a first category, then determine the format of the PUCCH and/or the information about the orthogonal sequence to be used by the PUCCH, corresponding to the DCI of the first category, wherein the format of the PUCCH corresponding to the DCI of the first category does not support spread transmission or only supports spread transmission for an orthogonal sequence with a fixed length; and when the DCI detected by the UE is DCI of a second category, then determine the format of the PUCCH and/or the information about the orthogonal sequence to be used by the PUCCH, corresponding to the DCI of the second category, wherein the format of the PUCCH corresponding to the DCI of the second category corresponds to information about a plurality of orthogonal sequences, wherein a length of the DCI of the first category is different from a length of the DCI of the second category.

15. The UE according to claim 14, wherein the DCI of the first category comprises a third indication field, wherein the third indication field indicates one of a plurality of formats of the PUCCH corresponding to the DCI of the first category; and/or,
  the DCI of the second category comprises a fourth indication field, wherein the fourth indication field indicates one of a plurality of formats of the PUCCH corresponding to the DCI of the second category; and/or,
  the DCI of the second category comprises a fifth indication field, wherein the fifth indication field indicates one of orthogonal sequences with a plurality of lengths corresponding to the DCI of the second category.

16. The UE according to claim 14, wherein when the processor determines the format of the PUCCH corresponding to the length of the detected DCI, the DCI comprises a sixth indication field, wherein the sixth indication field indicates the information about the orthogonal sequence to be used by the PUCCH corresponding to the DCI length.

17. The UE according to claim 13, wherein the information about the orthogonal sequence comprises an orthogonal sequence length and an orthogonal sequence index, and orthogonal sequences corresponding to each orthogonal sequence length are predefined; and/or,
  a length of the orthogonal sequence to be used by the PUCCH is determined according to the format of the PUCCH; wherein each format of the PUCCH corresponds to an orthogonal sequence length, or a seventh indication field in the DCI carries information about the orthogonal sequence corresponding to the format of the PUCCH; or the information about the orthogonal sequence to be used by the PUCCH is indicated in higher-layer signaling.

18. The UE according to claim 13, wherein the format of the PUCCH comprises one or more of a PUCCH format 2, a PUCCH format 3, and a new PUCCH format; and/or,
  the processor is further configured to transmit the UCI carried in the PUCCH according to a quantity of UCI feedback bits corresponding to the new PUCCH format when the determined format of the PUCCH is the PUCCH format 3.

19. A base station, comprising:
  a transceiver;
  a processor;
  a memory storing at least one instruction, wherein the processor is configured to execute the at least one instruction to:
  control the transceiver to transmit downlink control information (DCI) for indicating a format of a physical uplink control channel (PUCCH) and/or information about an orthogonal sequence to be used by the PUCCH; and
control the transceiver to receive uplink control information (UCI) carried in the PUCCH according to the format of the PUCCH and/or the information about the orthogonal sequence to be used by the PUCCH, corresponding to the DCI; and
a transceiver, configured to be controlled by the processor to receive and transmit data;
wherein the DCI comprises a first indication field, the base station determines the format of the PUCCH and the information about the orthogonal sequence to be used by the PUCCH, or the information about the orthogonal sequence to be used by the PUCCH, puts indication information indicating the format of the PUCCH and the information about the orthogonal sequence to be used by the PUCCH, or the information about the orthogonal sequence to be used by the PUCCH, in the first indication field, and transmits the DCI to a user equipment (UE), so that the UE obtains the format of the PUCCH and the information about the orthogonal sequence to be used by the PUCCH, or the information about the orthogonal sequence to be used by the PUCCH, according to the first indication field, wherein the information about the orthogonal sequence comprises an orthogonal sequence length; or
the base station determines the format of the PUCCH and/or the information about the orthogonal sequence to be used by the PUCCH, selects DCI whose number of bits corresponds to the determined format of the PUCCH and/or information about the orthogonal sequence to be used by the PUCCH, and transmits the DCI to the UE, so that the UE determines the format of the PUCCH and/or the information about the orthogonal sequence to be used by the PUCCH according to the number of DCI bits.

20. The base station according to claim 19, wherein the length of the DCI corresponds to the format of the PUCCH, wherein different DCI lengths correspond to different formats of the PUCCH; or
the length of the DCI corresponds to the information about the orthogonal sequence, wherein different DCI lengths correspond to information about different orthogonal sequences; or
the length of the DCI corresponds to the format of the PUCCH and the information about the orthogonal sequence, wherein different DCI lengths correspond to different combinations of formats of the PUCCH and orthogonal sequences to be used by the PUCCH; or
a format of the PUCCH corresponding to DCI of a first category does not support spread transmission or only supports spread transmission for an orthogonal sequence with a fixed length, and a format of the PUCCH corresponding to DCI of a second category corresponds to information about a plurality of orthogonal sequences, wherein a length of the DCI of the first category is different from a length of the DCI of the second category.

21. The base station according to claim 20, wherein the DCI of the first category comprises a third indication field, wherein the third indication field indicates one of a plurality of formats of the PUCCH corresponding to the DCI of the first category; and/or,
the DCI of the second category comprises a fourth indication field, wherein the fourth indication field indicates one of a plurality of formats of the PUCCH corresponding to the DCI of the second category; and/or,
the DCI of the second category comprises a fifth indication field, wherein the fifth indication field indicates one of orthogonal sequences with a plurality of lengths corresponding to the DCI of the second category.

22. The base station according to claim 20, wherein when the length of the DCI corresponds to the format of the PUCCH, the DCI comprises a sixth indication field, wherein the sixth indication field indicates the information about the orthogonal sequence to be used by the PUCCH corresponding to the length of the DCI.

23. The base station according to claim 19, wherein the information about the orthogonal sequence comprises an orthogonal sequence length and an orthogonal sequence index, and orthogonal sequences corresponding to each orthogonal sequence length are predefined; and/or,
a length of the orthogonal sequence to be used by the PUCCH is determined according to the format of the PUCCH; wherein each format of the PUCCH corresponds to an orthogonal sequence length, or a seventh indication field in the DCI carries information about the orthogonal sequence corresponding to the format of the PUCCH; or the information about the orthogonal sequence to be used by the PUCCH is indicated in higher-layer signaling.

24. The base station according to claim 19, wherein the format of the PUCCH comprises one or more of a PUCCH format 2, a PUCCH format 3, and a new PUCCH format; and/or,
when the determined format of the PUCCH is the PUCCH format 3, the UCI carried in the PUCCH is transmitted according to a quantity of UCI feedback bits corresponding to the new PUCCH format.

* * * * *